(12) United States Patent
Volin

(10) Patent No.: US 10,492,377 B2
(45) Date of Patent: Dec. 3, 2019

(54) UNIQUE ROLLABLE FIVE-DEVICE-IN-ONE SYSTEM COMPRISING ROLLABLE CLAWED-FOOT FLOWER CONTAINER, ROLLABLE ADJUSTABLE-RECEIVER UMBRELLA STAND, ROLLABLE WATER RESERVOIR, ROLLABLE WATER-REGULATING IRRIGATION SYSTEM, AND ROLLABLE WATER-CIRCULATING SYSTEM

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 301 days.

(21) Appl. No.: 15/587,349

(22) Filed: May 4, 2017

(65) Prior Publication Data

US 2017/0347533 A1 Dec. 7, 2017

Related U.S. Application Data

(60) Provisional application No. 62/344,100, filed on Jun. 1, 2016.

(51) Int. Cl.
*A01G 9/02* (2018.01)
*A01G 27/00* (2006.01)
*E04H 12/22* (2006.01)

(52) U.S. Cl.
CPC ............. *A01G 9/02* (2013.01); *A01G 27/005* (2013.01); *E04H 12/2246* (2013.01); *E04H 12/2269* (2013.01)

(58) Field of Classification Search
CPC .... A01G 9/02; A01G 27/005; E04H 12/2269; E04H 12/2246

(Continued)

(56) References Cited

U.S. PATENT DOCUMENTS 3,006,496 A * 10/1961 Weiman .................... B65D 9/12
217/12 R
3,800,471 A    4/1974 Adams
(Continued)

FOREIGN PATENT DOCUMENTS

CA    2636166    *  7/2008    ............... A01G 9/02
DE    2942100 A1 * 10/1979
GB    2366712 A  *  3/2002    ............. A01G 9/124

*Primary Examiner* — Tien Q Dinh
*Assistant Examiner* — Ebony E Evans

(57) ABSTRACT

A rollable five-device-in-one flower container and umbrella stand comprises: a container having multiple walls and a bottom, water-regulating channels formed in the bottom, two wheel wells formed in the bottom, anti-rolling claws formed in the bottom for digging into the ground on a slope to prevent the five-device-in-one flower container and umbrella stand from sliding down the slope, an umbrella-pole receiver screwed on the bottom, U-shaped and J-shaped spring clamps hooked on the umbrella-pole receiver for creating a clamping force therebetween, two wheels partially hidden in the two wheel wells, a tubular double-wall water reservoir having spiral water-distributing tubes and spiral water-regulating foams for spirally and timely discharging the water, and spiral water-circulating slides spirally welded or molded to the walls for spirally creating multiple spiral tractions, multiple spiral layers, multiple spiral travel distances for soil and water to create multiple spiral root growths and multiple spiral nutrition absorptions.

20 Claims, 21 Drawing Sheets

(58) Field of Classification Search
USPC .................................. 47/20.1, 66.6; 135/16
See application file for complete search history.

(56) References Cited

U.S. PATENT DOCUMENTS

| | | | |
|---|---|---|---|
| D245,408 S * | 8/1977 | Baumann | D11/155 |
| 4,160,342 A | 7/1979 | Dryer | |
| 4,268,994 A | 5/1981 | Urai | |
| 4,356,665 A | 11/1982 | de Oliveira | |
| 4,597,221 A | 7/1986 | Adair | |
| 5,363,594 A | 11/1994 | Davis | |
| 5,446,994 A | 9/1995 | Chou | |
| 5,555,676 A | 9/1996 | Lund | |
| D412,297 S * | 7/1999 | Roach | D11/152 |
| 5,960,587 A | 10/1999 | Brasseur, Jr. | |
| 6,070,359 A | 6/2000 | Liu | |
| 6,161,333 A | 12/2000 | Poston | |
| 6,381,902 B1 | 5/2002 | Batshon | |
| 6,446,649 B1 * | 9/2002 | Bigford | A45B 23/00 |
| | | | 135/16 |
| 6,615,542 B2 | 9/2003 | Ware | |
| 6,782,659 B2 | 8/2004 | Van Laere | |
| 7,055,282 B2 | 6/2006 | Bryan, III | |
| 7,155,860 B1 | 1/2007 | Ferguson | |
| 7,171,783 B1 | 2/2007 | Fidotti | |
| D556,627 S * | 12/2007 | Arev | D11/155 |
| 7,347,428 B2 * | 3/2008 | Edenso | A01G 9/02 |
| | | | 135/15.1 |
| 7,516,574 B2 | 4/2009 | Gottlieb | |
| 8,065,834 B2 | 11/2011 | Eckert | |
| D675,957 S * | 2/2013 | Thorson | D11/155 |
| 8,381,441 B2 | 2/2013 | Altendorfer | |
| 8,528,252 B2 | 9/2013 | Griebel | |
| D723,884 S | 3/2015 | Buquoi | |
| 9,010,021 B1 | 4/2015 | Rettger, II | |
| 9,043,962 B2 | 6/2015 | Trofe | |
| 9,060,472 B2 | 6/2015 | Li | |
| 9,101,099 B2 | 8/2015 | Nagels | |
| D744,771 S * | 12/2015 | Subbi | D6/675 |
| 9,974,369 B1 * | 5/2018 | DePaolo | A45B 23/00 |
| 2001/0054433 A1 * | 12/2001 | Patarra | A45B 3/00 |
| | | | 135/16 |
| 2002/0134017 A1 | 9/2002 | Gibbs | |
| 2006/0150486 A1 | 7/2006 | Andu | |
| 2010/0107488 A1 * | 5/2010 | King | A01G 13/0212 |
| | | | 47/20.1 |
| 2013/0227882 A1 * | 9/2013 | Thompson | A01G 9/086 |
| | | | 47/66.6 |
| 2015/0083172 A1 * | 3/2015 | Boal | A45B 11/00 |
| | | | 135/16 |
| 2018/0332774 A1 * | 11/2018 | Lott | A01G 9/026 |

* cited by examiner

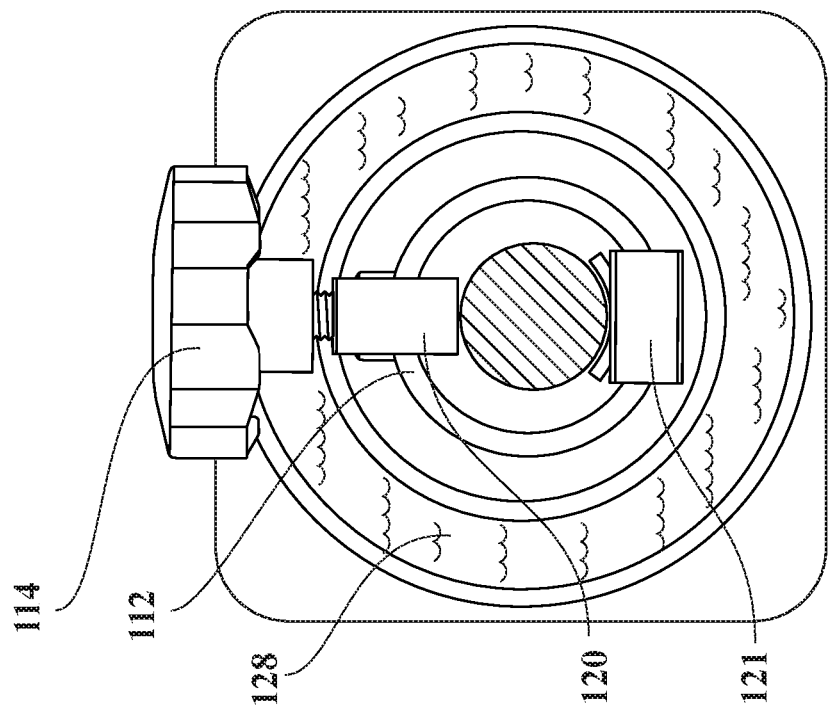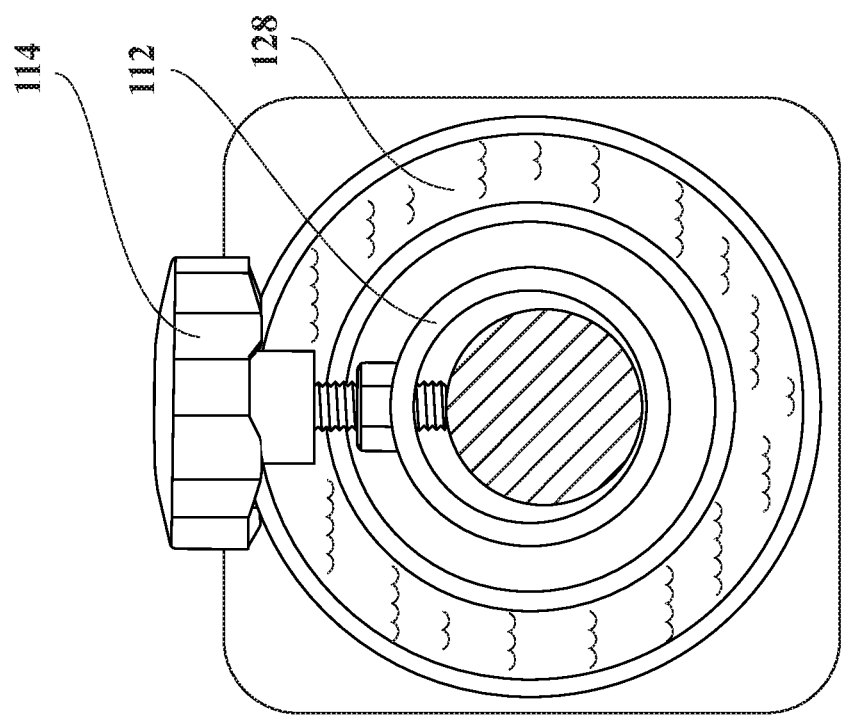

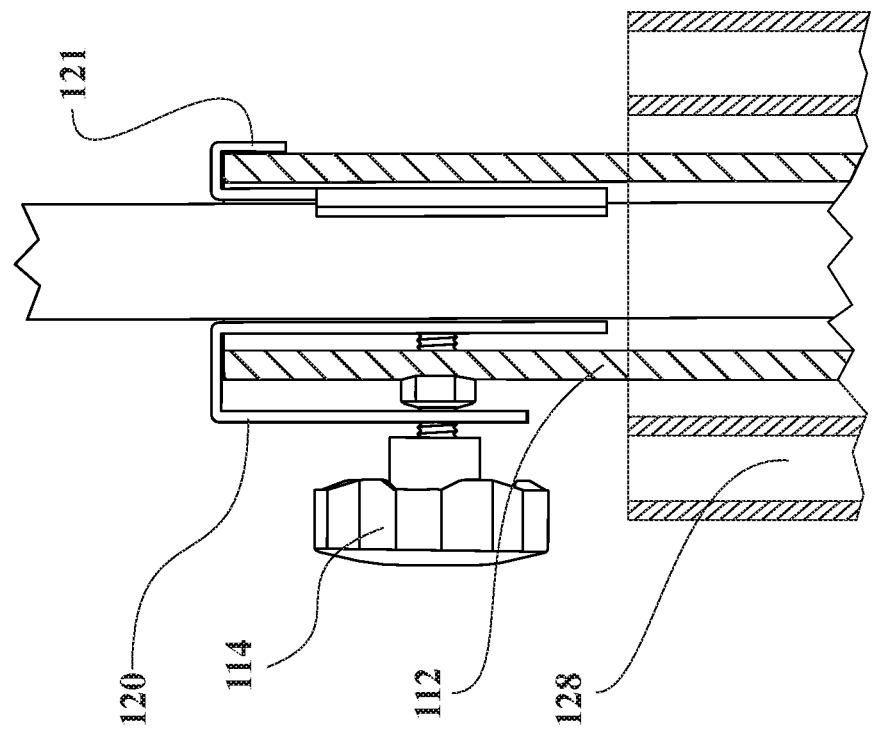
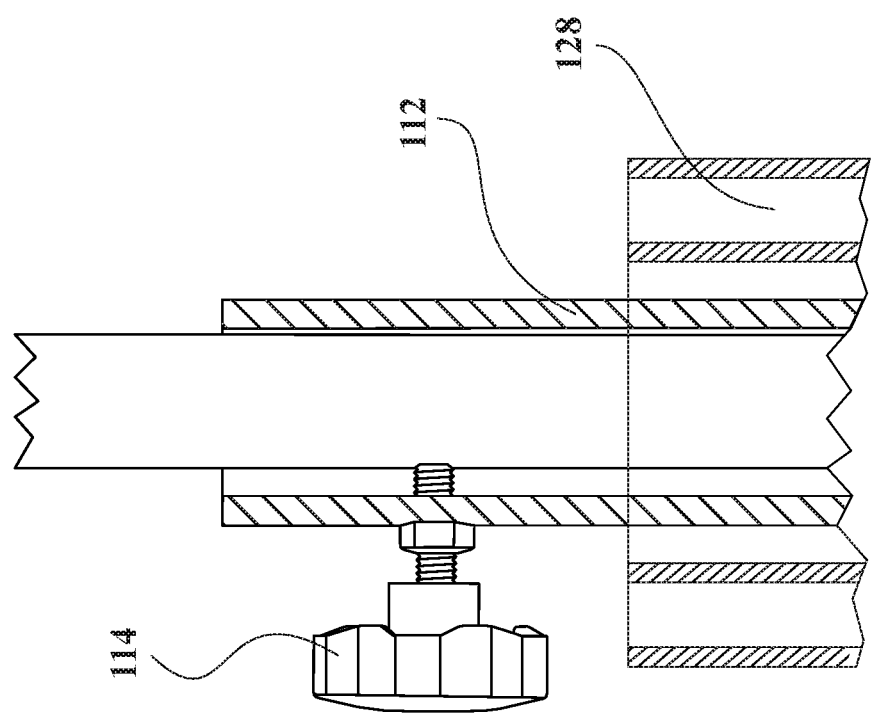

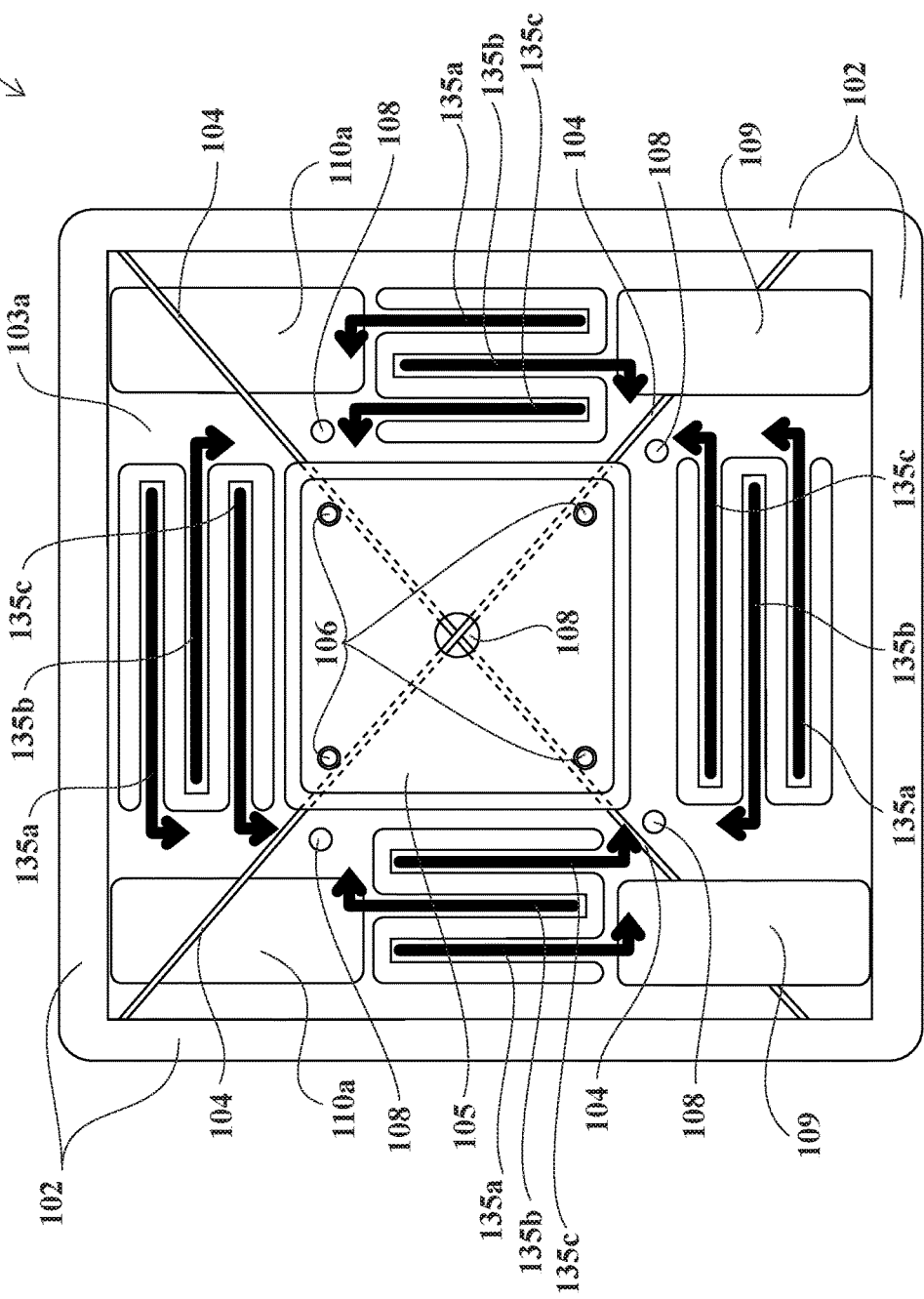

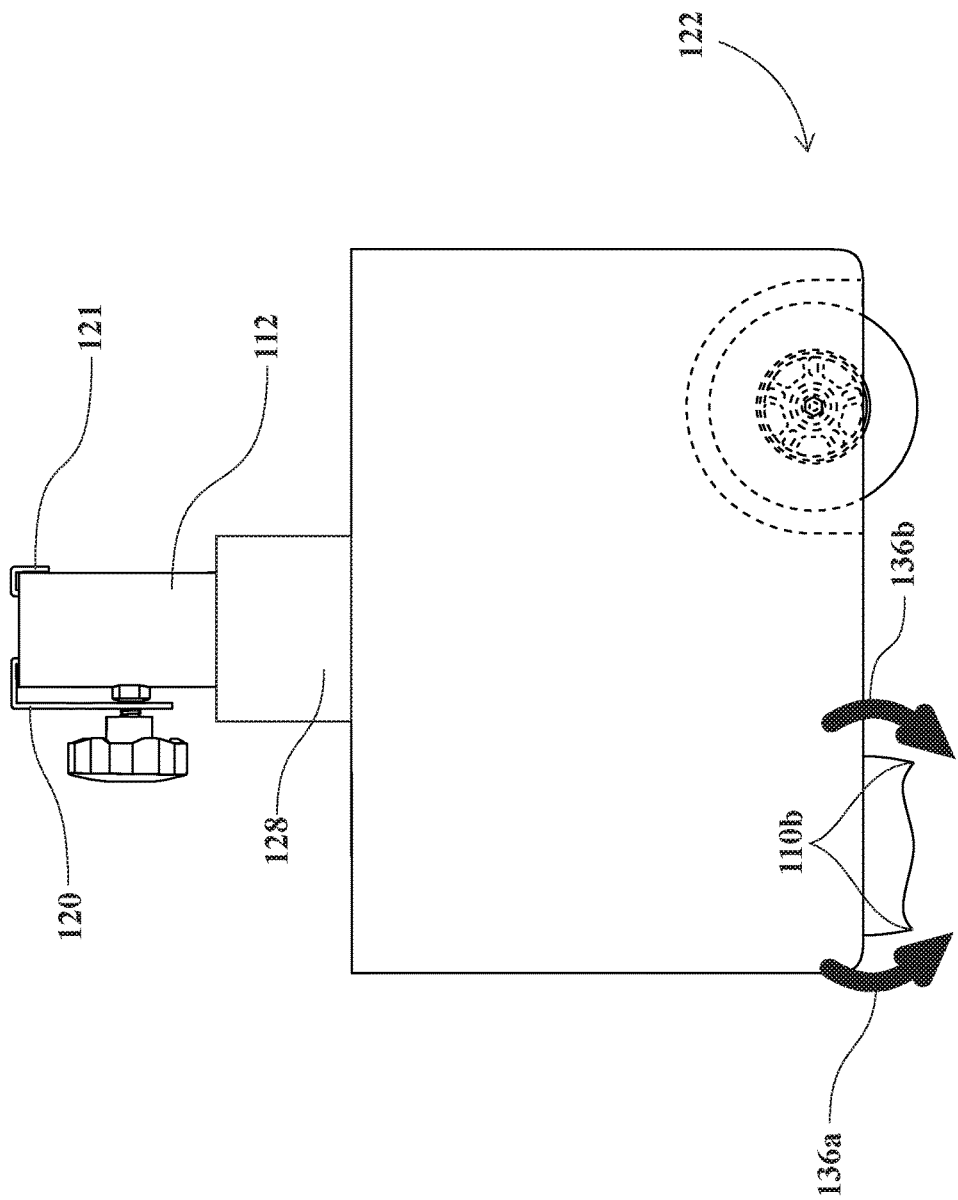

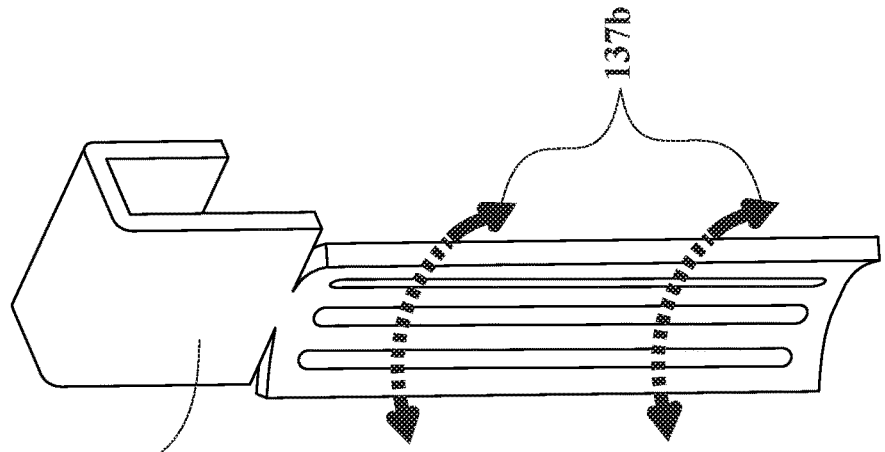
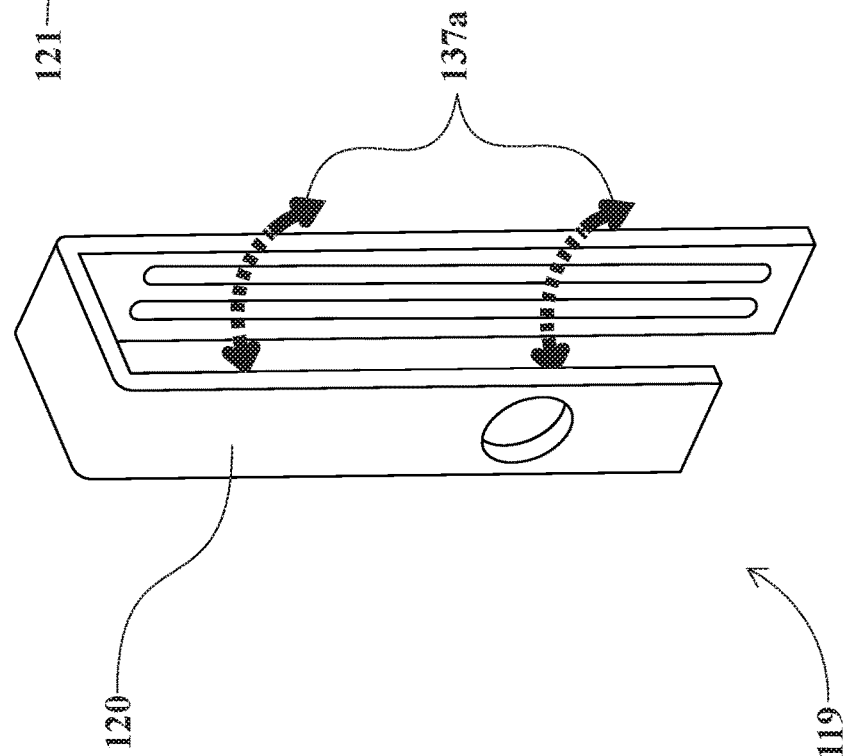

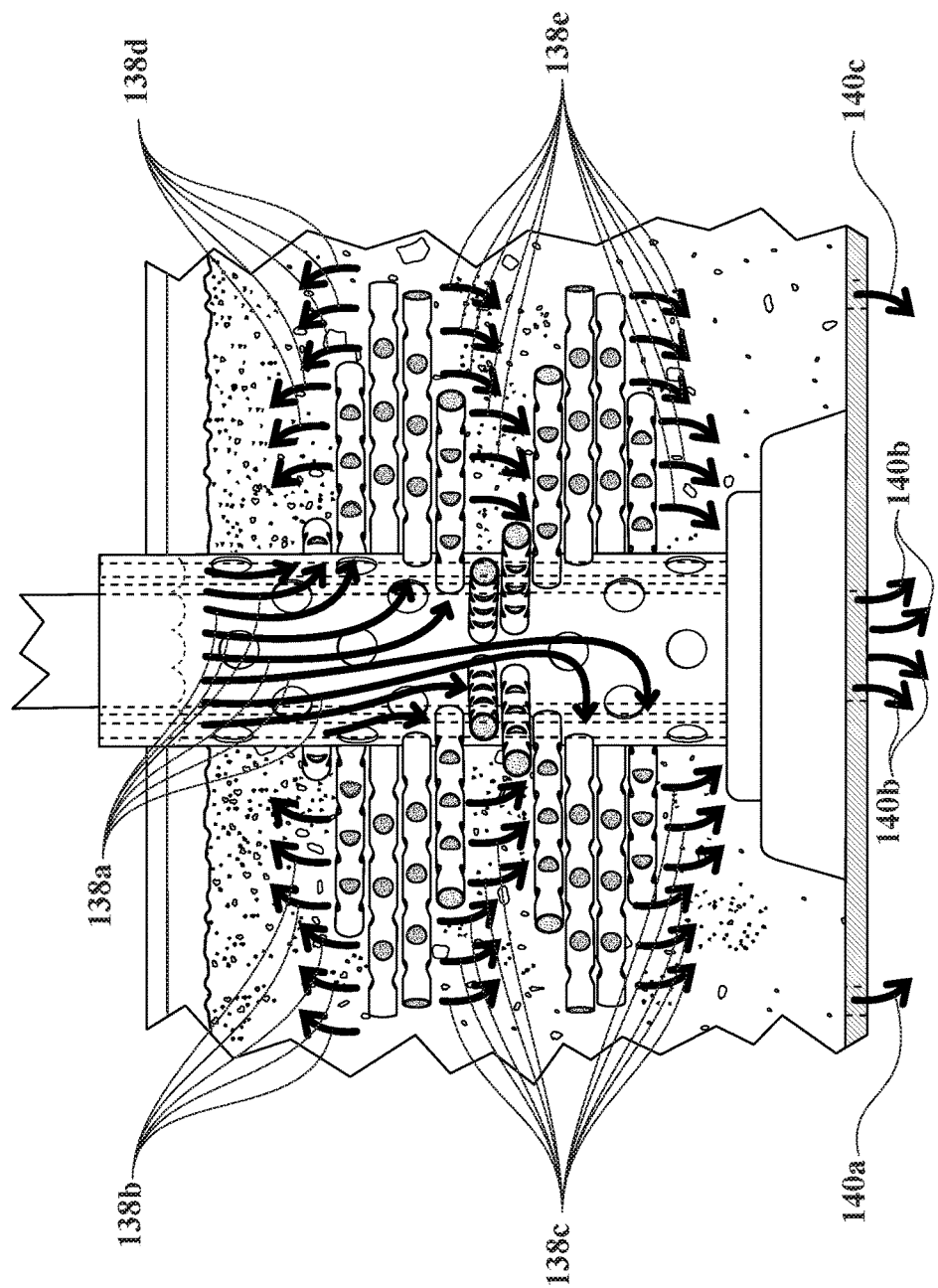

UNIQUE ROLLABLE FIVE-DEVICE-IN-ONE SYSTEM COMPRISING ROLLABLE CLAWED-FOOT FLOWER CONTAINER, ROLLABLE ADJUSTABLE-RECEIVER UMBRELLA STAND, ROLLABLE WATER RESERVOIR, ROLLABLE WATER-REGULATING IRRIGATION SYSTEM, AND ROLLABLE WATER-CIRCULATING SYSTEM

REFERENCE TO PREVIOUSLY FILED PROVISIONAL PATENT APPLICATION

Provisional Patent Application No. 62,344,100 was filed on Jun. 1, 2016.

FIELD OF THE INVENTION

The present invention relates to a flower container, which is cheap to produce, is easy to ship as one unit, can be quickly and easily assembled, and can be quickly and easily used. Particularly, the present invention relates to a unique rollable five-device-in-one system, comprising:
1) Rollable clawed-foot flower-container-and-umbrella-stand system,
2) Rollable adjustable-umbrella-pole-receiver system,
3) Rollable receiver-diameter-adjusting automatically-umbrella-pole-centering spring-bracket system,
4) Two wheel and axle systems,
5) Rollable water-reservoir-and-water-regulating irrigation system, and
6) Rollable water-circulating system.

DESCRIPTION OF THE PRIOR ART

A number of flower containers have been introduced.

U.S. Pat. No. 3,800,471, issued Apr. 2, 1974 to Alfred Adams, describes a flower pot which comprises an upwardly open container having a closed, watertight bottom wall and upright side walls. A plurality of apertures are spaced about the side walls at a predetermined elevation above the bottom. A reservoir basically comprising an H-shaped channel is supported in the bottom of the pot with the cross member or top of the channel at approximately the same level as the apertures in the side wall. The reservoir provides a space in the bottom of the pot void of soil and, because of apertures formed in its walls and top, allows free passage of water into and out of the space.

U.S. Pat. No. 4,160,342, issued Jul. 10, 1979 to Grant M. Dryer, details a pot for growing plants, wherein an outer pot has an upwardly facing interior annular shoulder therearound which is disposed below a downwardly facing exterior annular shoulder of an inner pot fitted within the outer pot. The inner pot has an inwardly projecting vertical sidewall formation which provides a channel through which water may be introduced into the bottom of the outer pot. The bottom of the inner pot is spaced above the bottom of the outer pot, and the inner pot has a downwardly extending well at its center which is spaced closely above the bottom of the outer pot, and which extends below the surface of the water in the bottom of the outer pot.

U.S. Pat. No. 4,268,994, issued May 26, 1981, to Muneharu Urai, reveals a three-dimensional decorative planter having a frame for securing a vertically disposed cultivation body and having a liquid reservoir and conduit for liquid from the reservoir to the cultivation body. The frame also has a trough for collecting excess liquid. The cultivation body includes culture material and filler in arrangements necessary to secure the culture material and provide watering, drainage and ventilation.

U.S. Pat. No. 4,356,665, issued Nov. 2, 1982, to Nenzito de Oliveira, describes a container for living plants, characterized by nesting pots, the upper pot of which defines a reservoir and the second of which rests within the first to contain a nutrient soil, the second, defining with the first, a water input and the second also having plural ducts extending downward into the reservoir, the ducts each having horizontal channels at respective bottoms with a vertical water flow passageway therein, allowing the flow of water from the reservoir by capillary action, the second pot also having drain holes located within the bottom of the pot, intermediate the respective ducts.

U.S. Pat. No. 4,597,221, issued Jul. 1, 1986, to Brenda A. Adair, refers to a plant receptacle for use with an umbrella-type table having a generally horizontal table top and an umbrella mounted to an umbrella supporting member extending generally vertically through an aperture located in said table top is disclosed. The receptacle comprises a first, outer container, a second, inner container and a central sleeve. The first container is generally saucer shaped and has a side wall and a bottom wall.

U.S. Pat. No. 5,363,594, issued Nov. 15, 1994, to Kenneth W. Davis, demonstrates a garden structure disclosed for producing a vertically oriented garden. It comprises a series of vertical, self contained, individual plant or crop growing containers, with growing orifices located on the exterior of a hexagonal shaped stock, with a hollow bore in the center containing a soilless, organic growth medium. The growing orifices are separated by a series of aeration holes. The plants or crop roots are inserted into the bore through the growth orifices and imbedded in the organic growth medium.

U.S. Pat. No. 5,446,994, issued Sep. 5, 1995, to Wen S. Chou, details a flower pot including a pot body having an annular water reservoir disposed at the top, a water supply regulator consisting of a base block disposed in the annular water reservoir, a water guiding strap having a leading end dipped in water in the annular water reservoir and an opposite end extended into the pot body to guide water from the annular water reservoir into the pot body by capillary action, and an adjusting block moved in a vertical sliding slot on the base block to adjust the elevation of the leading end of the water guiding strap in water; and a locating device fastened to the pot body to hold down the water guiding strap.

U.S. Pat. No. 5,555,676, issued Sep. 17, 1996, to John F. Lund, describes a vertical planter for supporting a plurality of plants vertically. The planter includes a hollow column mounted vertically on a water reservoir. The hollow column is fabricated from one or more column modules which are filled with a planting medium. A plurality of planting ports are formed in the wall of the hollow column to provide access for plants to be planted in the planting medium. Planter inserts can also be attached to the planting ports, the planter inserts supporting a body of the planting medium on the external surface of the hollow column.

U.S. Pat. No. 5,960,587, issued Oct. 5, 1999, to John J. Brasseur Jr., describes a planter adapted for circling an umbrella pole and resting upon a patio table top includes a large pot divided into two halves of identical geometry, and a drip tray similarly divided into two halves of identical geometry. Features are provided to lock each drip tray half into a corresponding pot half. Additional features allow each pot half to interlock to another, thereby forming a complete planter. The planter halves are separable and may be interchanged with other planter halves of the same geometry.

U.S. Pat. No. 6,070,359, issued Jun. 6, 2000, to Shan Pu Liu, outlines a flower pot structure with a natural water supply system including a pot body, a main water storage region, an upper cover, a central soil region, and a water supply device. The main water storage region is annular and located in an upper position of the pot body. The pot body and the main water storage region are adhered as a whole with the upper cover. The circumference of the main water storage region receives the water supply device.

U.S. Pat. No. 6,161,333, issued Dec. 19, 2000, to Rebecca Ann Poston, refers to a flower pot system for use on a patio table having an umbrella pole projecting upwardly form the center thereof. The flower pot system provides two flower pot members that together form a tubular passageway through which an umbrella pole is positionable. The two flower pot members are easily installable and removable from around an umbrella pole without lifting the umbrella pole from the patio table. A pair of drip trays are provided to hold the two flower pot members together and to provide a fluid pathway between the two flower pot members.

U.S. Pat. No. 6,381,902, issued May 7, 2000, to Abeer Batshon, defines a pot holder for use with posts including a pot portion having a generally cylindrical configuration. The pot portion has an open upper end, a closed lower end, and a surrounding side wall therebetween. The pot portion has an elongated cylinder positioned centrally therein. The elongated cylinder has an open upper end positioned within the open upper end of the pot portion. The elongated cylinder has an open lower end extending through the closed lower end of the pot portion. The elongated cylinder is dimensioned for receiving the post therethrough.

U.S. Pat. No. 6,615,542, issued Sep. 9, 2003, to Larry A. Ware, relates to the field of plant growth units, and more particularly pertains to an apparatus for plant cultivation which conserves horizontal space and utilizes vertical space, while providing for the growth of plants which are cultivated in an indoor environment. The plant growth unit includes a plurality of growth sites, means for supporting the growth sites, and means for establishing a liquid nutrient flow.

U.S. Pat. No. 6,782,659, issued Aug. 31, 2004, to Guy V. Van Laere, pertains to a flower pot assembly for keeping at least one plant temporarily alive without having to water it, includes a pot permeable to water in which the plant is potted with the required amount of soil, and a container impermeable to water in which the pot is received, so that a space is formed between the pot and the container. A gel formed of a water-absorbing polymer and water at least partially fills the space between the pot and the container. The container and gel are used as a packaging for the potted plant in order to keep this plant alive without having to water it during transport and when put on display for sale.

U.S. Pat. No. 7,055,282, issued Jun. 6, 2006, to Morris Bryan III, outlines a hydroponic system with modules having a hollow interior, a bottom wall with drain holes, and an open top end. A module conduit in each module carried by the bottom wall for channeling fluid through the hollow interior. The bottom wall of each module adapted to engage a top end of an adjacent module for stacking the modules in an end-to-end arrangement to form a planting column. A conduit receiving slot formed in the bottom wall of each module to engage a top portion of a conduit from an adjacent lower module when the modules are stacked end-to-end to provide a continuous fluid passageway through the planting column.

U.S. Pat. No. 7,155,860, issued Jan. 2, 2007, to George W. Ferguson, defines an umbrella mountable flower pot apparatus which includes a container that has a bottom wall and a perimeter wall that is attached to and extends upwardly from the bottom wall. The container has a hemispherical shape. A dividing wall is attached to and extends across the container. An aperture extends upwardly through the bottom wall and through the dividing wall. The container has a break therein so that the first portion is separable from the second portion and a pair of dividing walls is defined. A coupling apparatus is attached to the first and second portions and is configured to secure the first and second portions together and to a post extending through the aperture.

U.S. Pat. No. 7,171,783, issued Feb. 6, 2007, to Giampiero Fidotti, defines a container (1) for the cultivation of plants is described, the container (1) comprising an inner container (2) for housing a plant cultivation medium (C), an outer container (3) fixed around the inner container (2) and provided with a bottom wall (5) arranged at a predetermined distance (d.sub.f) from the bottom wall (5) of the inner container (2), the outer container (3) defining with the inner container (2) an airspace (7) substantially sealed in a fluid-tight manner, wherein a storage zone (A) of an irrigation liquid (L) is defined, and an elongated element (10) for the capillary upwelling of the irrigation liquid (L) towards said cultivation medium (C). The container (1) of the invention enables to provide the plant housed in the cultivation medium (C) with the proper quantity of irrigation liquid (L) as a function of the plant needs.

U.S. Pat. No. 7,516,574, issued Apr. 4, 2009, to John Gottlieb, refers to a vertical garden including a reservoir containing a nutrient rich liquid. A stack of modular planters are nested together above the reservoir. A vertically extending tubular pipe passes through central openings in the modular planters. The tubular pipe communicates with a manifold within the reservoir. An air pump located outside of the reservoir has an outlet hose terminating in an air inlet port in the manifold. Compressed air flows from the air pump into the manifold and flows up through the pipe to a diffuser plate at the top.

U.S. Pat. No. 8,065,834, issued Nov. 29, 2011, to Karl Eckert, outlines a two part plant container that includes an outer tub part having a series of step indentations around its perimeter forming horizontal rest surfaces within the outer part which are located above a lower region forming a water reservoir space. The inner part has a bottom wall areas resting on the surfaces with the inner part nested within an upper region of the outer part.

U.S. Pat. No. 8,381,441, issued Feb. 26, 2013, to George Altendorfer, details an insertable watering device for a standard bucket comprising, a circular planar base member, central chamber, plurality of wicks, fill tube, and support legs. The insertable device provides support for soil and allows for the watering of plants contained in the soil by capillary action using a wick through the transfer of water below the base member and into the soil layer.

U.S. Pat. No. 8,528,252, issued Sep. 10, 2013, to Arthur F. Briebel, describes this self-watering planter comprises a wick, reservoir, wick-housing running between the soil/soil substitute and the reservoir, and a tight fitting cap to maintain a vacuum seal within the reservoir. The water or liquid mixture is maintained at a constant level across the wick by the vacuum that is created. This prevents water from flowing upwards into the soil when the soil is already wet. Liquid is only draw from the wick by osmosis when the soil is dry.

U.S. Pat. No. 9,010,021, issued Apr. 21, 2015, to Robert E. Rettger II, refers to an adjustable water retention device for a plant pot has a plant container nesting in a second outer pot, with a facilitated flow of water communicating between the second outer pot and the plant container, wherein the second outer pot rests on a base.

U.S. Pat. No. 9,043,962, issued Jun. 2, 2015, to Danielle K. Trofe, pertains to a self-irrigating planter system that waters vegetation on a regular schedule using hollow upright supports to convey the water from a pump and reservoir to multiple organic-shaped pods that are attached to the upright supports in a tiered manner, and which uses gravity to deliver water so as to provide sustained plant growth and a healthier living environment with reduced energy usage.

U.S. Pat. No. 9,060,472, issued Jun. 23, 2015, to Ali Li, describes a plant container which includes a container body and an automate watering arrangement, wherein the automate watering arrangement includes a reserve unit and a plurality of watering units. Each of the watering units includes a guiding element and a watering element, wherein one end of the guiding element is communicated with the reserve unit, and another end of the guiding element is coupled with the watering element end-to-end.

U.S. Pat. No. 9,101,099, issued Aug. 11, 2015, to Bryce D. Nagels, demonstrates an indoor plant growing system and a method of using the same system which includes a base defining an interior compartment, a mast extending upwardly from the base, a first arm extending outwardly from the mast, a cable hanging downwardly from the first arm, one or more pots engaged on the cable, and a water delivery system connecting a water supply and the uppermost pot. The water supply preferably is a reservoir disposed inside the base's compartment.

U.S. Pat. No. D723,884, issued Mar. 10, 2015, to Mathew Buquoi, depicts the ornamental design for a planter circle reservoir, as shown and described.

U.S. Patent No 20020134017, issued Sep. 26, 2002, to Gerald E. Gibbs, relates to a post planter, which is constructed of two identical parts with the parts being constructed to be located around a square shaped or rectangular post. The post planter includes an interior chamber the lower portion of which is to contain water and the upper portion of which is to contain a plant growing medium. The two parts are to be connected together by fasteners forming a single unit. There is a post receiving opening formed within the planter and this post receiving opening is size adjustable.

U.S. Patent No 20060150486, issued Jul. 13, 2006, to Adedamola Andu, details a self-watering apparatus (1) comprising: (i) a filling tube (2) with an opening (3) at high level, said tube (2) being in fluid communication with a delivery tube (5) located at low level; (ii) a main water holding reservoir (4) adapted, in use, to receive water from said delivery tube (5), said reservoir (4) being in fluid communication with a second delivery tube (11); (iii) at least one storage chamber (10) a having a discharge orifice (13), said storage chamber (10) being adapted, in use, to receive water from the main water holding reservoir (4) by means of a second delivery tube (11) which optionally may have a capillary plug; (iv) optionally, one or more further storage chambers (16) having further discharge orifices (14) at least one of the further storage chambers (16) being in fluid communication with said chamber (10) and a pressure relieving tube (20), and (v) an outlet tube (18) with an opening (19) at high-level within said reservoir (4) through which air can be drawn into the apparatus under the control of a moisture-sensitive valve (17).

DISADVANTAGES OF THE PRIOR ART

The prior art have failed to solve many problems associated with such flower containers, as follows:

1) No prior art mention or disclose any flower container, having
    rollable spirally-disposed spirally-water-circulating slides.
    Therefore, the prior art of flower container:
        a) Can not create spiral traction for soil to stay on,
            to prevent the soil from being washed downwards
            (FIGS. 1, 4, 5, 15, and 20);
        b) Can not create spiral traction for soil to stay on,
            to prevent the soil from being washed away
            (FIGS. 1, 4, 5, 15, and 20);
        c) Can not create spiral traction for soil to stay on,
            to allow the soil to gradually move downwards spirally
            (FIGS. 1, 4, 5, 15, and 20);
        d) Can not create spiral traction for soil to stay on,
            to allow the soil to gradually move away spirally
            (FIGS. 1, 4, 5, 15, and 20);
2) No prior art mention or disclose any flower container, having
    rollable spirally-disposed spirally-water-circulating slides.
    Therefore, the prior art of flower container:
        a) Can not spirally redirect the moisture,
            to be distributed over a larger surface area
            (FIGS. 1, 4, 5, 15, and 20);
        b) Can not provide the moisture sufficient opportunity
            to osmotically distribute throughout soil within the container,
            to evenly moisten the soil from top to bottom
            (FIGS. 1, 4, 5, 15, and 20);
        c) Can not slowly disperse moisture,
            to reduce the gravitational influence affecting the moisture
            (FIGS. 1, 4, 5, 15, and 20);
        d) Can not utilize the moisture more effectively and efficiently,
            to require less water, thereby lowering water costs
            (FIGS. 1, 4, 5, 15, and 20); and
        e) Can not utilize the moisture more effectively and efficiently,
            to require less water, thereby being more environmentally responsible
            (FIGS. 1, 4, 5, 15, and 20).
3) No prior art mention or disclose any flower container, having
    rollable four water-regulating channels.
    Therefore, the prior art of flower container:
        a) Can not force water collection at flower-container-and-umbrella-base bottom,
            to stimulate absorption into soil
            (FIGS. 3, and 16);
        b) Can not act as a raceway to spread collected water through flower-container-and-umbrella-base bottom,
            to evenly distribute moisture to plant root system
            (FIGS. 3, and 16);
        c) Can not provide a network of cavities in which the plant root system will cluster and nest,
            to enable root system to more affectively metabolize nutrients
            (FIGS. 3, and 16); and
        d) Can not furnish a network of cavities in which the plant root system will cluster and nest,
            to provide greater surface area and therefore greater stability for the root system
            (FIGS. 3, and 16).

4) No prior art mention or disclose any flower container, having
two wheel hiding wells.
Therefore, the prior art of flower container:
   a) Can not enable larger circumference wheels, while axel height being vertically higher than flower-container-and-umbrella-base bottom,
      to result in a lower center of gravity
      (FIGS. 1, 2, 3, 4, 5 11, and 12);
   b) Can not enable larger circumference wheels, while axel height being vertically higher than flower-container-and-umbrella-base bottom,
      to result in an easier and more convenient movement of rollable clawed-foot flower-container-and-umbrella-stand system
      (FIGS. 1, 2, 3, 4, 5 11, and 12);
   c) Can not provide larger circumference wheels, while axel height being vertically higher than flower-container-and-umbrella-base bottom,
      to contain and safely, rollably transport a relatively heavier umbrella, flag pole, artificial tree, sign post, etc.
      (FIGS. 1, 2, 3, 4, 5 11, and 12); and
   d) Can not provide larger circumference wheels, while axel height being vertically higher than flower-container-and-umbrella-base bottom,
      to contain and safely, rollably transport a relatively taller umbrella, flag pole, artificial tree, sign post, etc.
      (FIGS. 1, 2, 3, 4, 5 11, and 12).
5) No prior art mention or disclose any flower container, having
a rollable receiver-diameter-adjusting automatically-umbrella-pole-center spring-bracket system.
Therefore, the prior art of flower container:
   a) Can not provide a convenient self-centering opposing-spring clamp,
      to accommodate umbrella poles, flag poles, artificial trees, sign posts, etc. and self-center when inserted
      (FIGS. 6, 7A, 7B, 9A, 9B, 10A, 10B, 13, 17, 18A and 18B);
   b) Can not provide a convenient diameter-adjusting opposing-spring clamp,
      to secure a large range of diameters of umbrella poles, flag poles, artificial trees, sign posts, etc.
      (FIGS. 6, 7A, 7B, 9A, 9B, 10A, 10B, 13, 17, 18A and 18B);
   c) Can not provide a multi-functional opposing-spring pole clamp,
      to adjust to a variety of different diameters without requiring any tools
      (FIGS. 6, 7A, 7B, 9A, 9B, 10A, 10B, 13, 17, 18A and 18B); and
   d) Can not provide a self-storage system for auxiliary components,
      to instantly store an adjustable u-shaped spring clamp and a fixed J-shaped automatically-umbrella-pole-centering spring clamp, when not in use
      (FIGS. 6, 7A, 7B, 9A, 9B, 10A, 10B, 13, 17, 18A and 18B).
6) No prior art mention or disclose any flower container, having
a rollable water-reservoir-and-water-regulating irrigation system.
Therefore, the prior art of flower container:
   a) Can not operate independently and is self-contained,
      to be used in locations where there is no water spigot available
      (FIGS. 8, 9A, 9B, 10A, 10B, 13, 14, 15, and 19);
   b) Can not operate independently without a hose leading to a rollable clawed-foot flower-container-and-umbrella-stand system,
      to be used in public places without posing a danger to pedestrians, from a hose being an obstacle and a tripping hazard, such as a restaurant patio, a sidewalk, a park, etc.
      (FIGS. 8, 9A, 9B, 10A, 10B, 13, 14, 15, and 19);
   c) Can not function discretely while hidden by surrounding plants,
      to be aesthetically pleasing while displayed in public areas
      (FIGS. 8, 9A, 9B, 10A, 10B, 13, 14, 15, and 19); and
   d) Can not fully function discretely without a water hose attached,
      to be aesthetically pleasing while displayed in public areas
      (FIGS. 8, 9A, 9B, 10A, 10B, 13, 14, 15, and 19).
7) No prior art mention or disclose any flower container, having
a tubular water reservoir, spirally-disposed irrigation tubes, and water-regulating foam cylinder.
Therefore, the prior art of flower container:
   a) Can not distribute moisture to soil within a flower-container-and-umbrella-base bottom,
      to evenly moisten the soil from side to side
      (FIGS. 14, 15, and 19);
   b) Can not distribute moisture to soil within a flower-container-and-umbrella-base bottom,
      to evenly moisten the soil from top to bottom
      (FIGS. 14, 15, and 19);
   c) Can not sequentially distribute water in a spiral pattern within a flower-container-and-umbrella-base bottom,
      to evenly moisten the soil from top to bottom
      (FIGS. 14, 15, and 19);
   d) Can not sequentially distribute water in a spiral pattern within a flower-container-and-umbrella-base bottom,
      to evenly moisten the soil from side to side
      (FIGS. 14, 15, and 19); and
   e) Can not provide a structure of perforated tubes in which the plant root system will attach,
      to enable root system to bind with soil and container more affectively
      (FIGS. 14, 15, and 19).
8) No prior art mention or disclose any flower container, having
two anti-rolling feet and four anti-rolling claws.
Therefore, the prior art of flower container:
   a) Can not provide unique self-adjusting, pliable, multi-angled-surface friction blocks,
      to resist movement thereby stabilizing rollable clawed-foot flower-container-and-umbrella-stand system when standing level on a concrete surface
      (FIGS. 2, 3, 4, 5, 12, 13, and 17);
   b) Can not provide unique self-adjusting, pliable, multi-angled-surface friction blocks,
      to resist movement thereby stabilizing rollable clawed-foot flower-container-and-umbrella-stand system when standing level on a gravel surface
      (FIGS. 2, 3, 4, 5, 12, 13, and 17);
   c) Can not provide unique self-adjusting, pliable, multi-angled-surface friction blocks, to resist movement thereby stabilizing rollable clawed-foot flower-container-and-umbrella-stand system when standing level on a sandy surface (FIGS. 2, 3, 4, 5, 12, 13, and 17);
d) Can not provide unique self-adjusting, pliable, multi-angled-surface friction blocks,
to resist movement thereby stabilizing rollable clawed-foot flower-container-and-umbrella-stand system when standing level on a tile surface (FIGS. 2, 3, 4, 5, 12, 13, and 17); and
e) Can not provide unique self-adjusting, pliable, multi-angled-surface friction blocks,
to resist movement thereby stabilizing rollable clawed-foot flower-container-and-umbrella-stand system when standing level on a slick surface (FIGS. 2, 3, 4, 5, 12, 13, and 17).

OBJECTS AND ADVANTAGES OF THE INVENTION

The present invention substantially departs from the conventional concepts and designs of the prior art. In doing so, the present invention provides a unique rollable five-device-in-one system (having: a) Rollable claw-foot flower container, b) Rollable adjustable-receiver umbrella stand, c) Rollable water reservoir, d) Rollable water-regulating irrigation system, and e) Rollable water-circulating system) having many unique and significant features, functions, and advantages, which overcome all the disadvantages of the prior art, as follows:

1) It is an object of the new invention to provide
a unique rollable five-device-in-one system, having
rollable spirally-disposed spirally-water-circulating slides.
Therefore, the unique rollable five-device-in-one system:
a) Can create spiral traction for soil to stay on,
to prevent the soil from being washed downwards (FIGS. 1, 4, 5, 15, and 20);
b) Can create spiral traction for soil to stay on,
to prevent the soil from being washed away (FIGS. 1, 4, 5, 15, and 20);
c) Can create spiral traction for soil to stay on,
to allow the soil to gradually move downwards spirally (FIGS. 1, 4, 5, 15, and 20);
d) Can create spiral traction for soil to stay on,
to allow the soil to gradually move away spirally (FIGS. 1, 4, 5, 15, and 20);

2) It is another object of the new invention to provide
a unique rollable five-device-in-one system, having
rollable spirally-disposed spirally-water-circulating slides.
Therefore, the unique rollable five-device-in-one system:
a) Can spirally redirect the moisture,
to be distributed over a larger surface area (FIGS. 1, 4, 5, 15, and 20);
b) Can provide the moisture sufficient opportunity to osmotically distribute throughout soil within the container,
to evenly moisten the soil from top to bottom (FIGS. 1, 4, 5, 15, and 20);
c) Can slowly disperse moisture,
to reduce the gravitational influence affecting the moisture (FIGS. 1, 4, 5, 15, and 20);
d) Can utilize the moisture more effectively and efficiently,
to require less water, thereby lowering water costs (FIGS. 1, 4, 5, 15, and 20); and
e) Can utilize the moisture more effectively and efficiently,
to require less water, thereby being more environmentally responsible (FIGS. 1, 4, 5, 15, and 20).

3) It is still another object of the new invention to provide
a unique rollable five-device-in-one system, having
rollable four water-regulating channels.
Therefore, the unique rollable five-device-in-one system:
a) Can force water collection at flower-container-and-umbrella-base bottom,
to stimulate absorption into soil (FIGS. 3, and 16);
b) Can act as a raceway to spread collected water through flower-container-and-umbrella-base bottom,
to evenly distribute moisture to plant root system (FIGS. 3, and 16);
c) Can provide a network of cavities in which the plant root system will cluster and nest,
to enable root system to more affectively metabolize nutrients (FIGS. 3, and 16); and
d) Can furnish a network of cavities in which the plant root system will cluster and nest,
to provide greater surface area and therefore greater stability for the root system (FIGS. 3, and 16).

4) It is a further object of the new invention to provide
a unique rollable five-device-in-one system, having
two wheel hiding wells.
Therefore, the unique rollable five-device-in-one system:
a) Can enable larger circumference wheels, while axel height being vertically higher than flower-container-and-umbrella-base bottom,
to result in a lower center of gravity (FIGS. 1, 2, 3, 4, 5 11, and 12);
b) Can enable larger circumference wheels, while axel height being vertically higher than flower-container-and-umbrella-base bottom,
to result in an easier and more convenient movement of rollable clawed-foot flower-container-and-umbrella-stand system (FIGS. 1, 2, 3, 4, 5 11, and 12);
c) Can provide larger circumference wheels, while axel height being vertically higher than flower-container-and-umbrella-base bottom,
to contain and safely, rollably transport a relatively heavier umbrella, flag pole, artificial tree, sign post, etc. (FIGS. 1, 2, 3, 4, 5 11, and 12); and
d) Can provide larger circumference wheels, while axel height being vertically higher than flower-container-and-umbrella-base bottom,
to contain and safely, rollably transport a relatively taller umbrella, flag pole, artificial tree, sign post, etc. (FIGS. 1, 2, 3, 4, 5 11, and 12).

5) It is an even further object of the new invention to provide
a unique rollable five-device-in-one system, having
a rollable receiver-diameter-adjusting automatically-umbrella-pole-center spring-bracket system.
Therefore, the unique rollable five-device-in-one system:
a) Can provide a convenient self-centering opposing-spring clamp, to accommodate umbrella poles, flag poles, artificial trees, sign posts, etc. and self-center when inserted (FIGS. 6, 7A, 7B, 9A, 9B, 10A, 10B, 13, 17, 18A and 18B);
b) Can provide a convenient diameter-adjusting opposing-spring clamp,
to secure a large range of diameters of umbrella poles, flag poles, artificial trees, sign posts, etc. (FIGS. 6, 7A, 7B, 9A, 9B, 10A, 10B, 13, 17, 18A and 18B);
c) Can provide a multi-functional opposing-spring pole clamp,
to adjust to a variety of different diameters without requiring any tools (FIGS. 6, 7A, 7B, 9A, 9B, 10A, 10B, 13, 17, 18A and 18B); and
d) Can provide a self-storage system for auxiliary components,
to instantly store an adjustable u-shaped spring clamp and a fixed J-shaped automatically-umbrella-pole-centering spring clamp, when not in use (FIGS. 6, 7A, 7B, 9A, 9B, 10A, 10B, 13, 17, 18A and 18B).
6) It is still another object of the new invention to provide a unique rollable five-device-in-one system, having a rollable water-reservoir-and-water-regulating irrigation system.
Therefore, the unique rollable five-device-in-one system:
a) Can operate independently and is self-contained,
to be used in locations where there is no water spigot available (FIGS. 8, 9A, 9B, 10A, 10B, 13, 14, 15, and 19);
b) Can operate independently without a hose leading to rollable clawed-foot flower-container-and-umbrella-stand system,
to be used in public places without posing a danger to pedestrians, from a hose being an obstacle and a tripping hazard, such as a restaurant patio, a sidewalk, a park, etc. (FIGS. 8, 9A, 9B, 10A, 10B, 13, 14, 15, and 19);
c) Can function discretely while hidden by surrounding plants,
to be aesthetically pleasing while displayed in public areas (FIGS. 8, 9A, 9B, 10A, 10B, 13, 14, 15, and 19); and
d) Can fully function discretely without a water hose attached,
to be aesthetically pleasing while displayed in public areas (FIGS. 8, 9A, 9B, 10A, 10B, 13, 14, 15, and 19).
7) It is yet another object of the new invention to provide a unique rollable five-device-in-one system, having a tubular water reservoir, spirally-disposed irrigation tubes, and water-regulating foam cylinder.
Therefore, the unique rollable five-device-in-one system:
a) Can distribute moisture to soil within a flower-container-and-umbrella-base bottom,
to evenly moisten the soil from side to side (FIGS. 14, 15, and 19);
b) Can distribute moisture to soil within a flower-container-and-umbrella-base bottom,
to evenly moisten the soil from top to bottom (FIGS. 14, 15, and 19);
c) Can sequentially distribute water in a spiral pattern within a flower-container-and-umbrella-base bottom,
to evenly moisten the soil from top to bottom (FIGS. 14, 15, and 19);
d) Can sequentially distribute water in a spiral pattern within a flower-container-and-umbrella-base bottom,
to evenly moisten the soil from side to side (FIGS. 14, 15, and 19); and
e) Can provide a structure of perforated tubes in which the plant root system will attach,
to enable root system to bind with soil and container more affectively (FIGS. 14, 15, and 19).
8) It is still yet an even further object of the new invention to provide
a unique rollable five-device-in-one system, having two anti-rolling feet and four anti-rolling claws.
Therefore, the unique rollable five-device-in-one system:
a) Can provide unique self-adjusting, pliable, multi-angled-surface friction blocks,
to resist movement thereby stabilizing rollable clawed-foot flower-container-and-umbrella-stand system when standing level on a concrete surface (FIGS. 2, 3, 4, 5, 12, 13, and 17);
b) Can provide unique self-adjusting, pliable, multi-angled-surface friction blocks,
to resist movement thereby stabilizing rollable clawed-foot flower-container-and-umbrella-stand system when standing level on a gravel surface (FIGS. 2, 3, 4, 5, 12, 13, and 17);
c) Can provide unique self-adjusting, pliable, multi-angled-surface friction blocks,
to resist movement thereby stabilizing rollable clawed-foot flower-container-and-umbrella-stand system when standing level on a sandy surface (FIGS. 2, 3, 4, 5, 12, 13, and 17);
d) Can provide unique self-adjusting, pliable, multi-angled-surface friction blocks,
to resist movement thereby stabilizing rollable clawed-foot flower-container-and-umbrella-stand system when standing level on a tile surface (FIGS. 2, 3, 4, 5, 12, 13, and 17); and
e) Can provide unique self-adjusting, pliable, multi-angled-surface friction blocks,
to resist movement thereby stabilizing rollable clawed-foot flower-container-and-umbrella-stand system when standing level on a slick surface (FIGS. 2, 3, 4, 5, 12, 13, and 17).
Other objects and advantages of the present invention will become apparent from the consideration of the accompanying drawings and ensuing description.

BRIEF DESCRIPTION OF THE DRAWINGS

FIGS. 9A, 9B, 10A, and 10B illustrate top and cross-sectional views of a rollable receiver-diameter-adjusting automatically-umbrella-pole-centering spring-bracket system and a rollable water-reservoir-and-water-regulating irrigation system.

FIG. 16 illustrates a top view of how four water-regulating channels regulate the flow directions of irrigation water, expand the travel areas of irrigation water, and lengthen the travel distances of irrigation water.

FIG. 17 illustrates a front view of how four anti-rolling claws dig into the ground when the unique rollable five-device-in-one system sits on a slope or is pushed to lock the unique rollable five-device-in-one system in place to prevent it from moving.

FIGS. 18A and 18B illustrate perspective views of how a rollable receiver-diameter-adjusting automatically-umbrella-pole-centering spring-bracket system automatically and springably centers multiple umbrella poles of different diameters, springably adapts to multiple umbrella poles of different diameters, and springably clamps multiple umbrella poles of different diameters.

FIG. 19 illustrates an internal view of how a rollable water-reservoir-and-water-regulating irrigation system stores and regulates water for irrigation inside the unique rollable five-device-in-one system.

SUMMARY OF THE INVENTION

Figure 1:
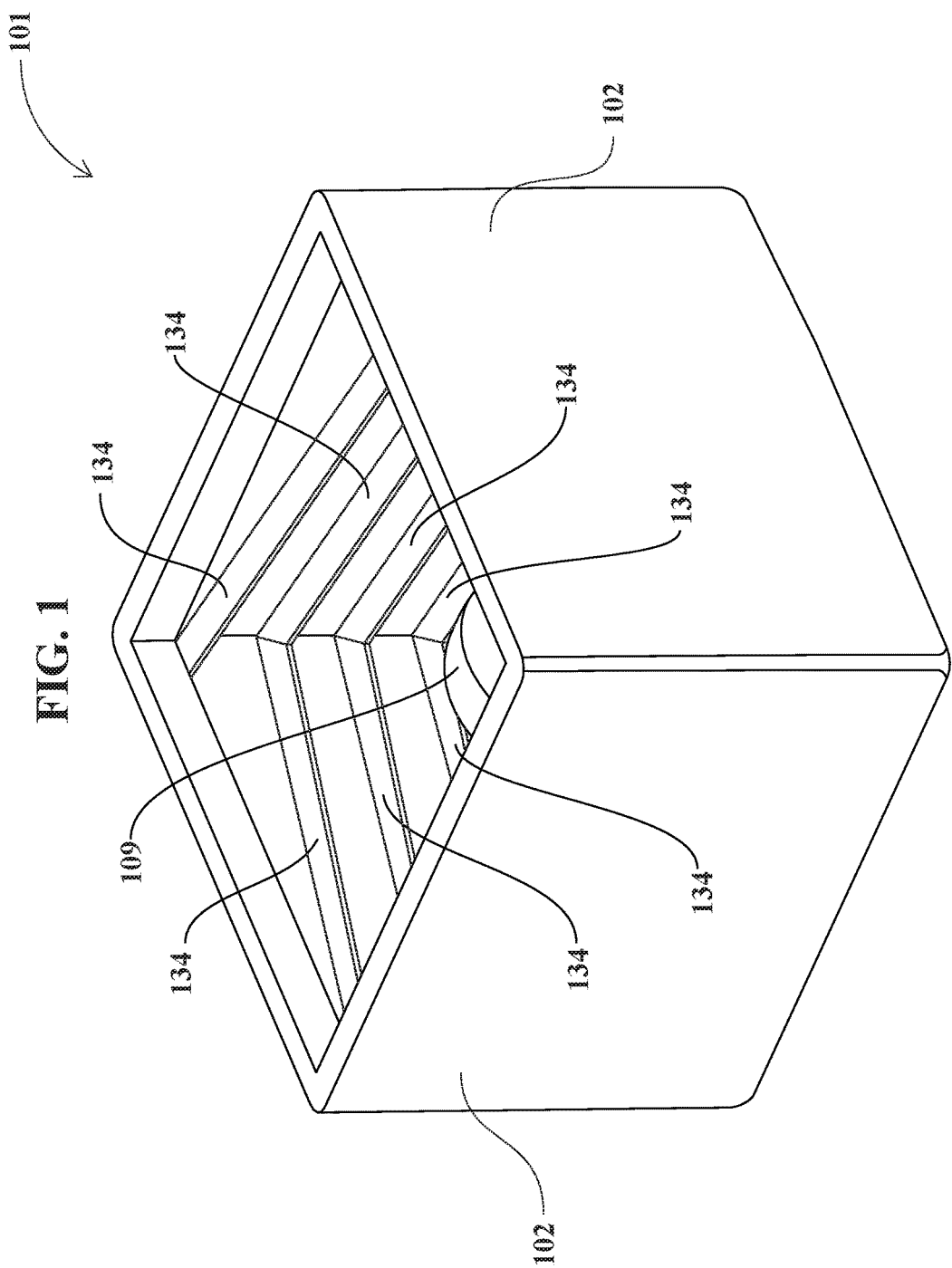
FIGS. 1 and 2 illustrate top-perspective and bottom-perspective views of a unique rollable five-device-in-one system, comprising rollable clawed-foot flower container, rollable adjustable-receiver umbrella stand, rollable water reservoir, rollable water-regulating irrigation system, and rollable water-circulating system.
Figure 2:
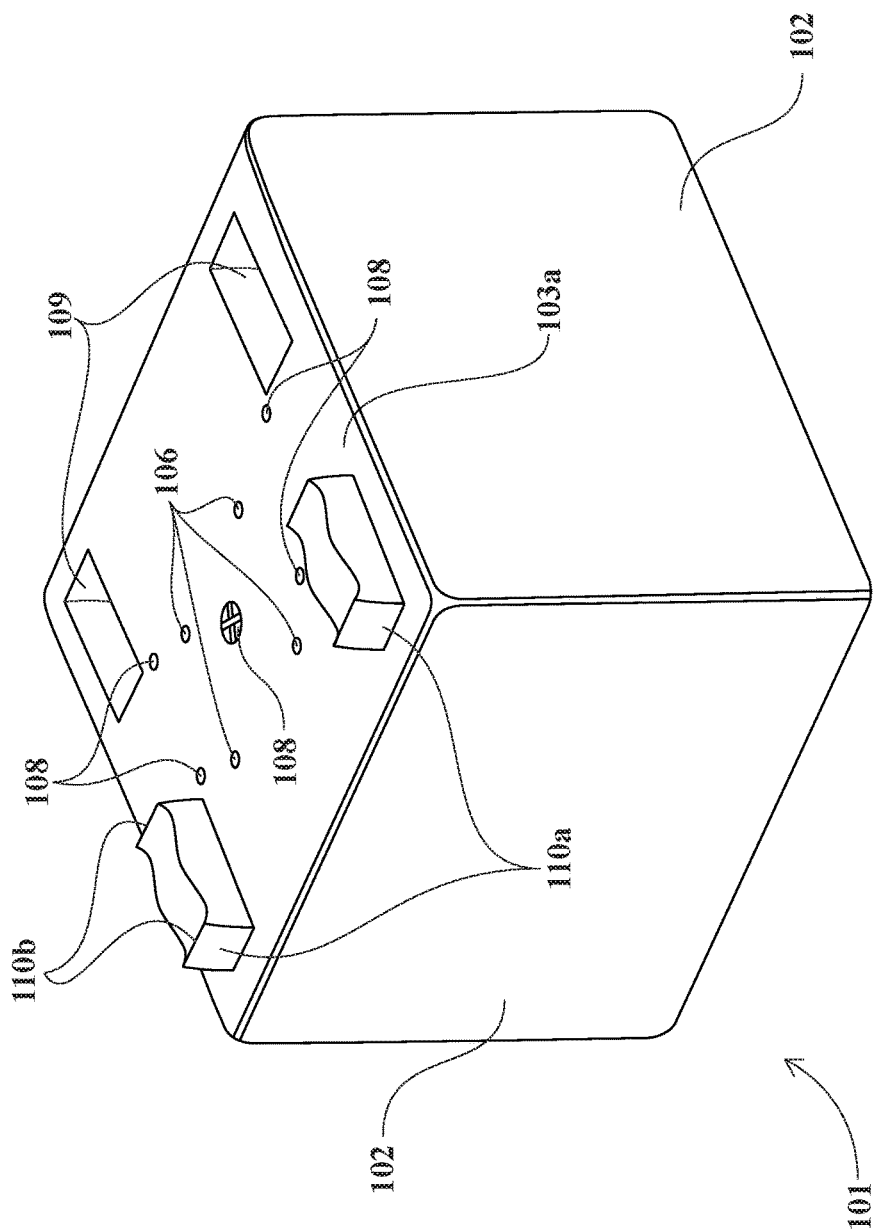
Figure 3:
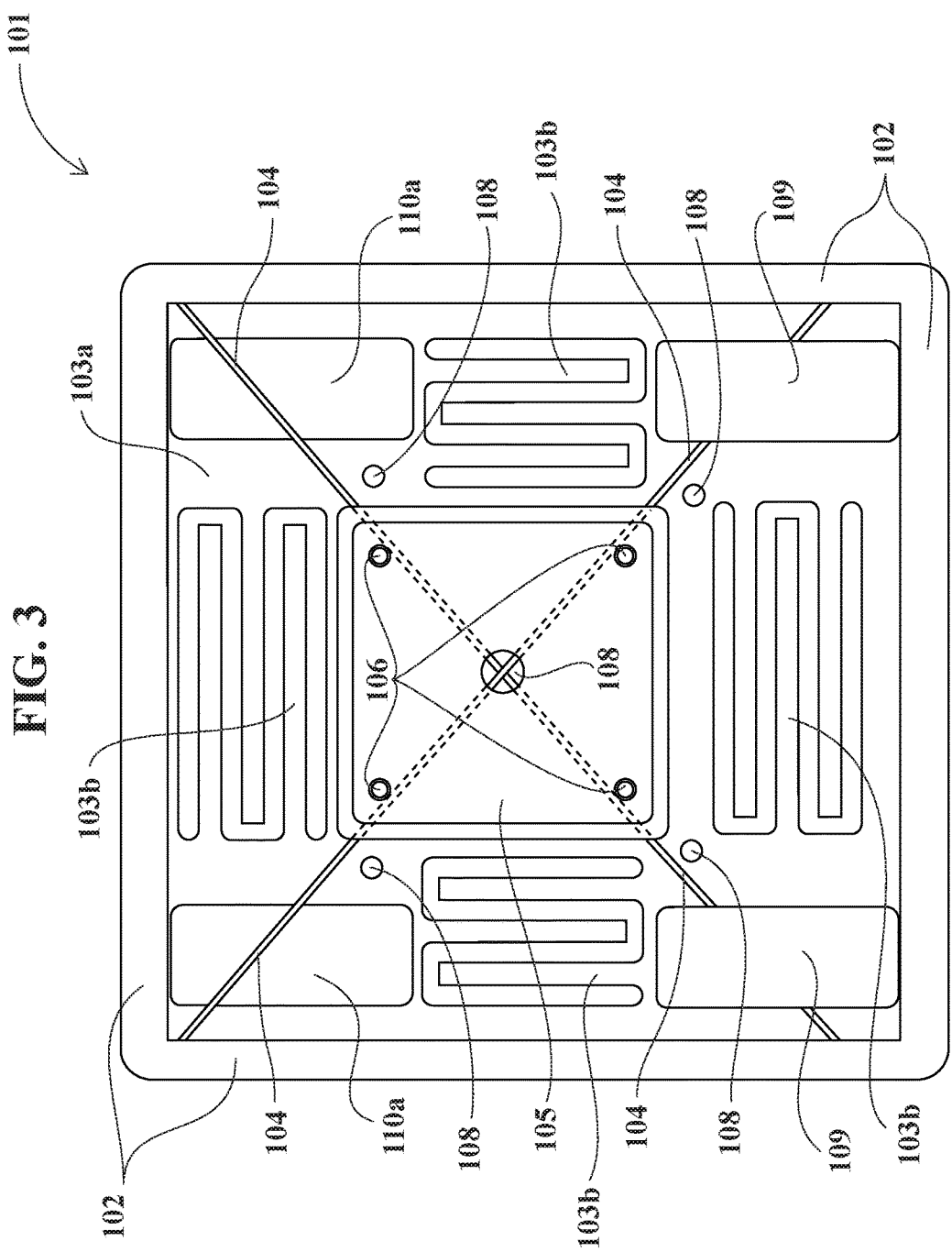
FIGS. 3, 4, and 5 illustrate top, side, and front views of the unique rollable five-device-in-one system, comprising rollable clawed-foot flower container, rollable adjustable-receiver umbrella stand, rollable water reservoir, rollable water-regulating irrigation system, and rollable water-circulating system.
Figure 4:
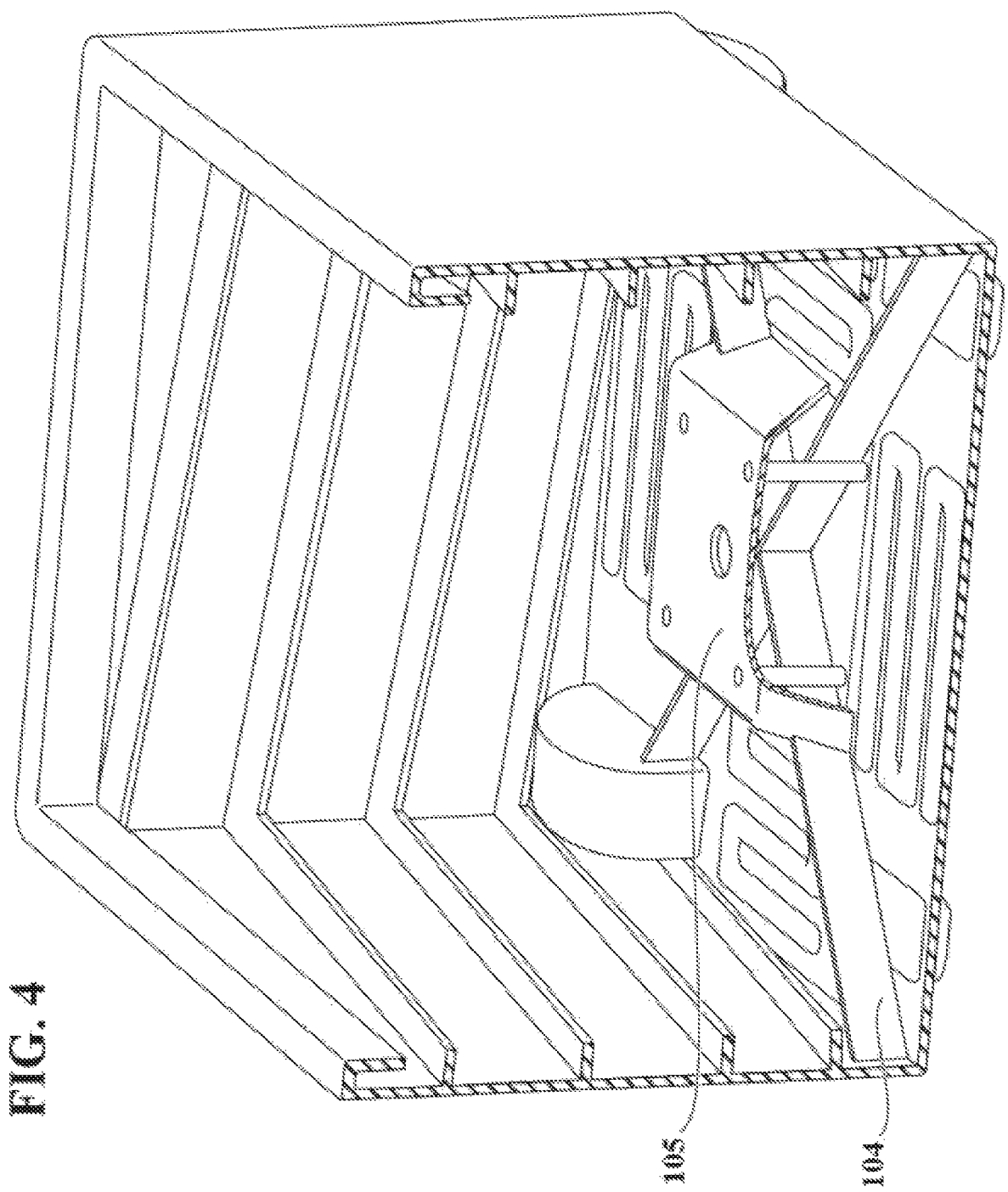
Figure 5:
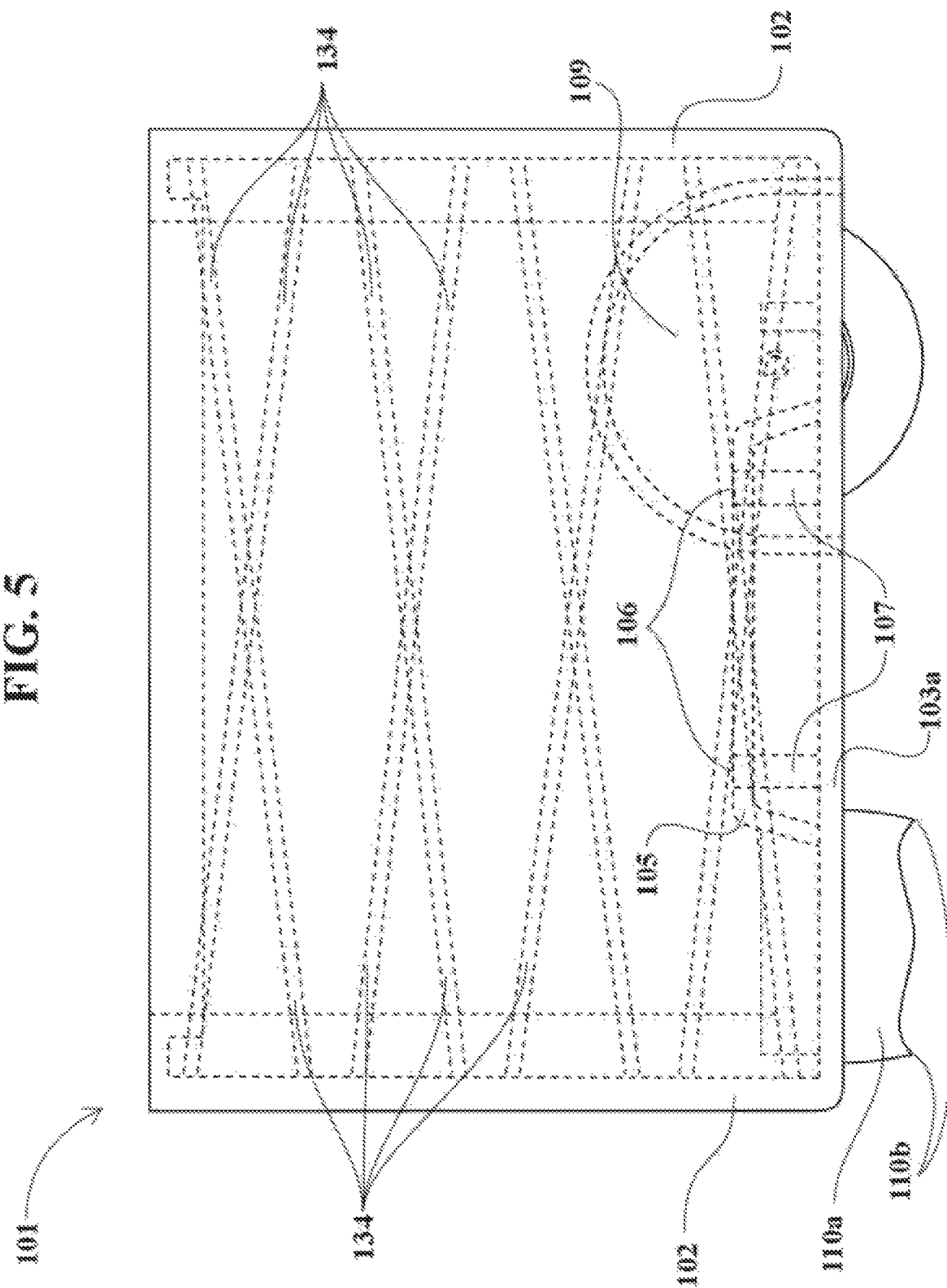
Figure 6:
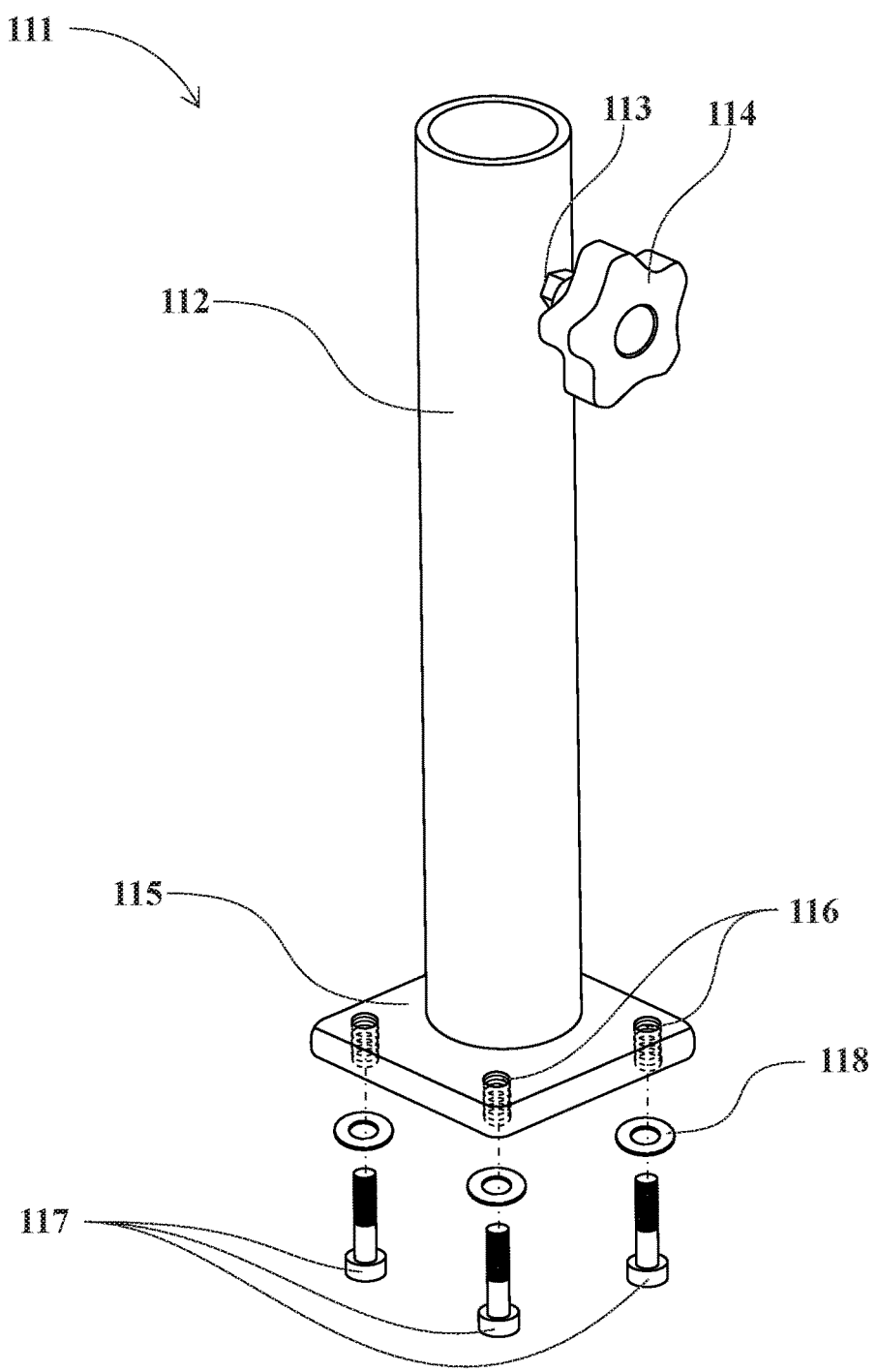
FIG. 6 illustrates a perspective view of a rollable adjustable-umbrella-pole-receiver system.
Figure 7B:
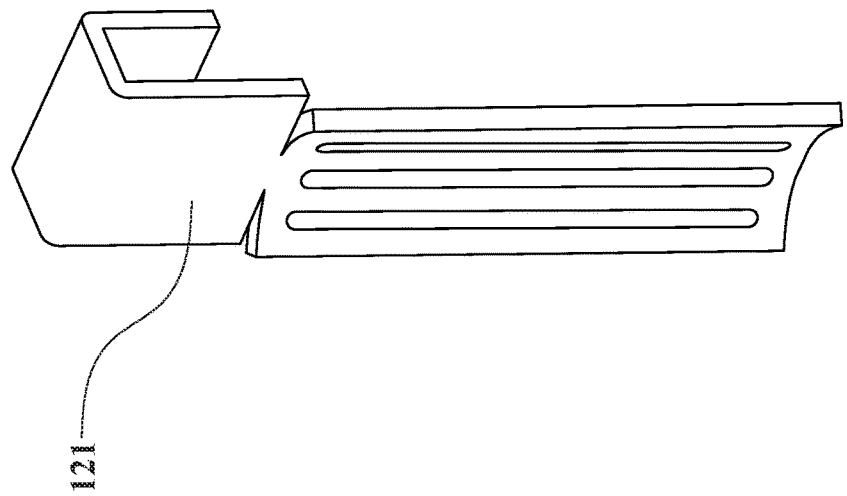
FIGS. 7A and 7B illustrate perspective views of a rollable receiver-diameter-adjusting automatically-umbrella-pole-centering spring-bracket system.
Figure 7A:
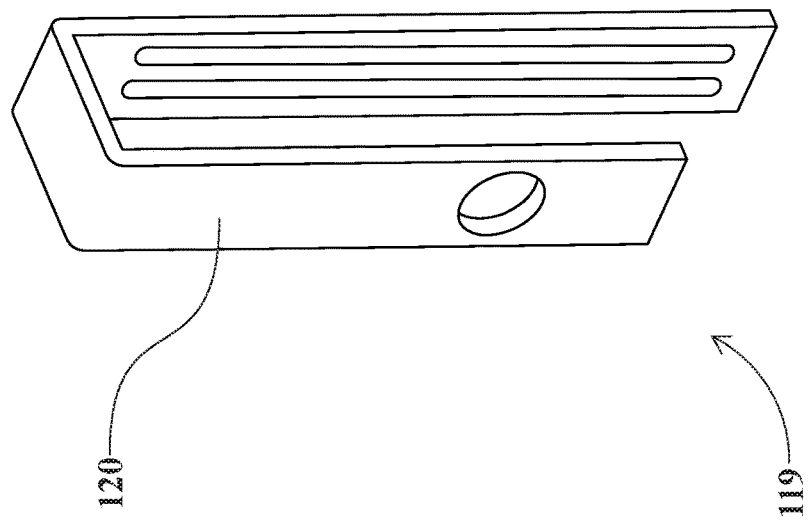
Figure 8:
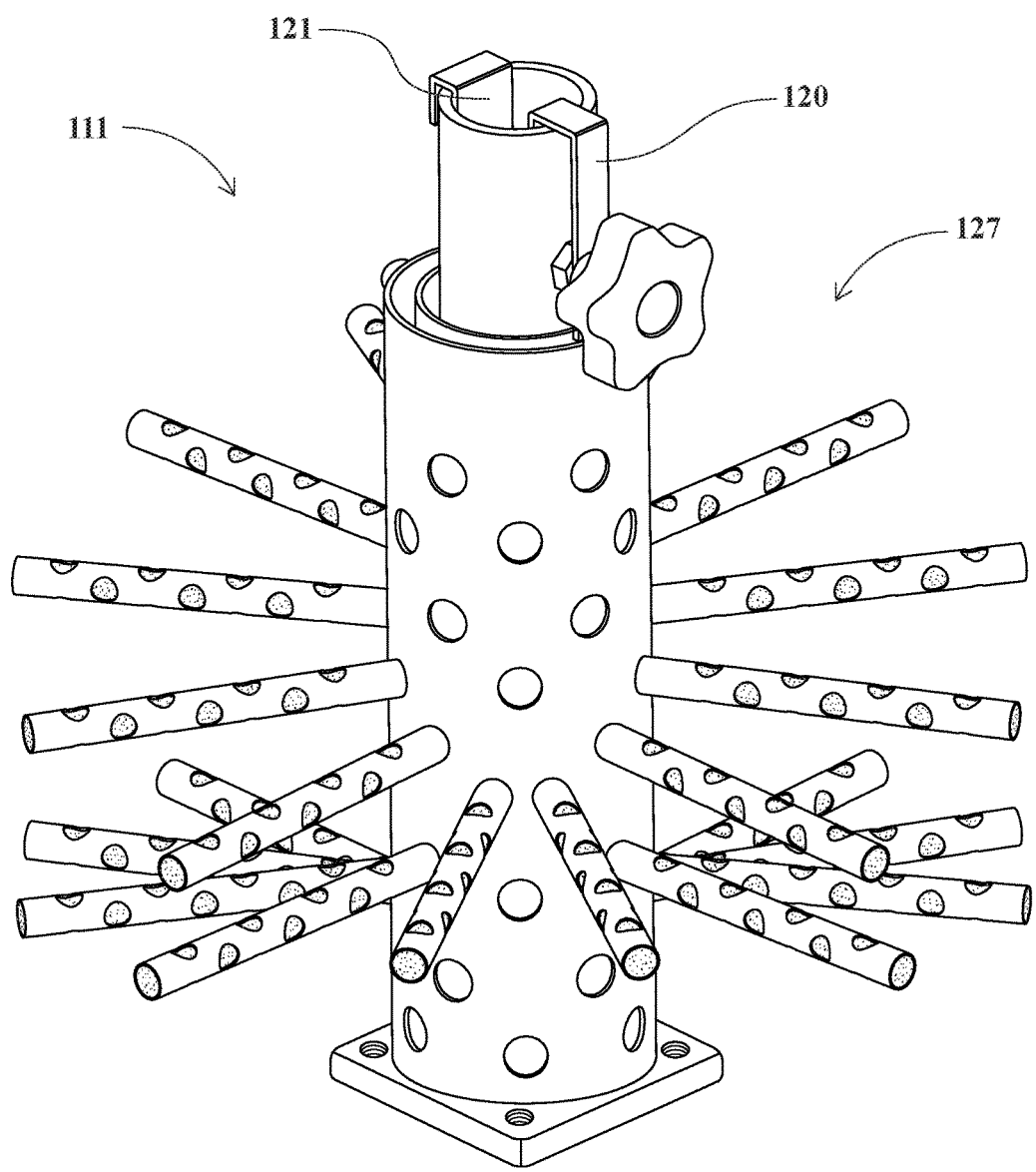
FIG. 8 illustrates a perspective view of a rollable receiver-diameter-adjusting automatically-umbrella-pole-centering spring-bracket system, a rollable water-reservoir-and-water-regulating irrigation system, and a rollable water-circulating system.
Figure 11:
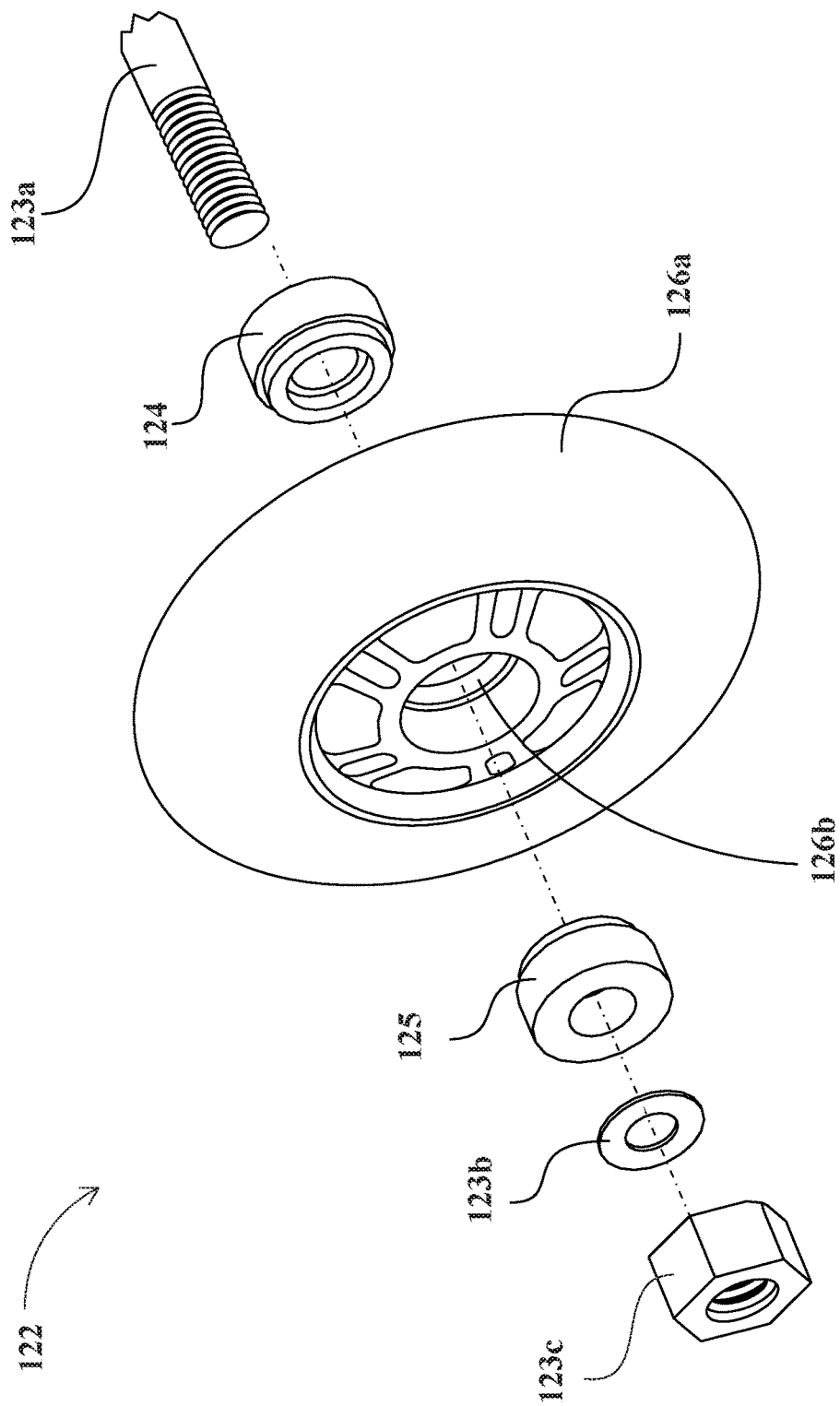
FIG. 11 illustrates a perspective view of two wheel and axle systems.
Figure 12:
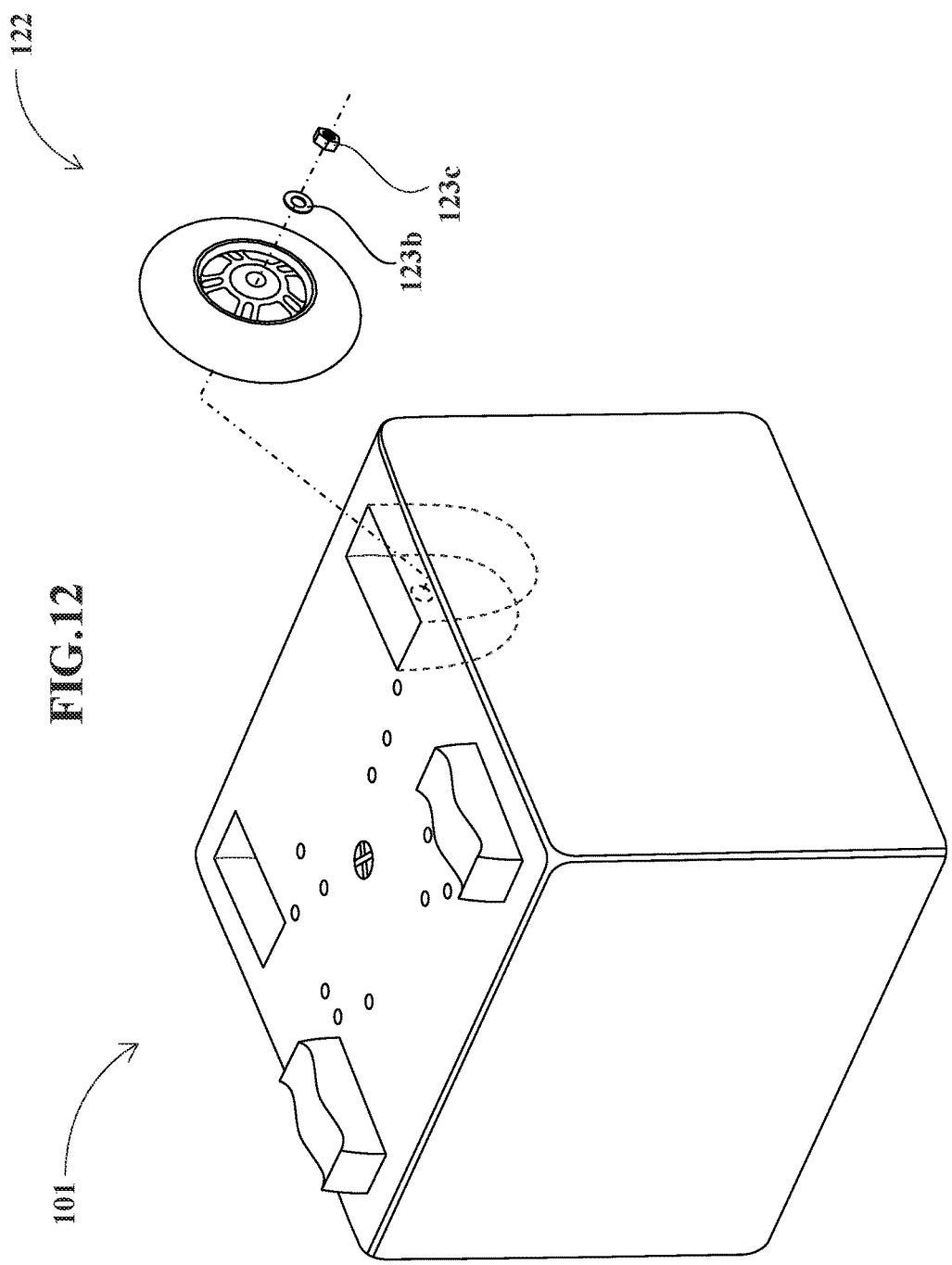
FIGS. 12 and 13 illustrate perspective and front views of two wheel and axle systems and how they are rotatably connected to the unique rollable five-device-in-one system.
Figure 13:
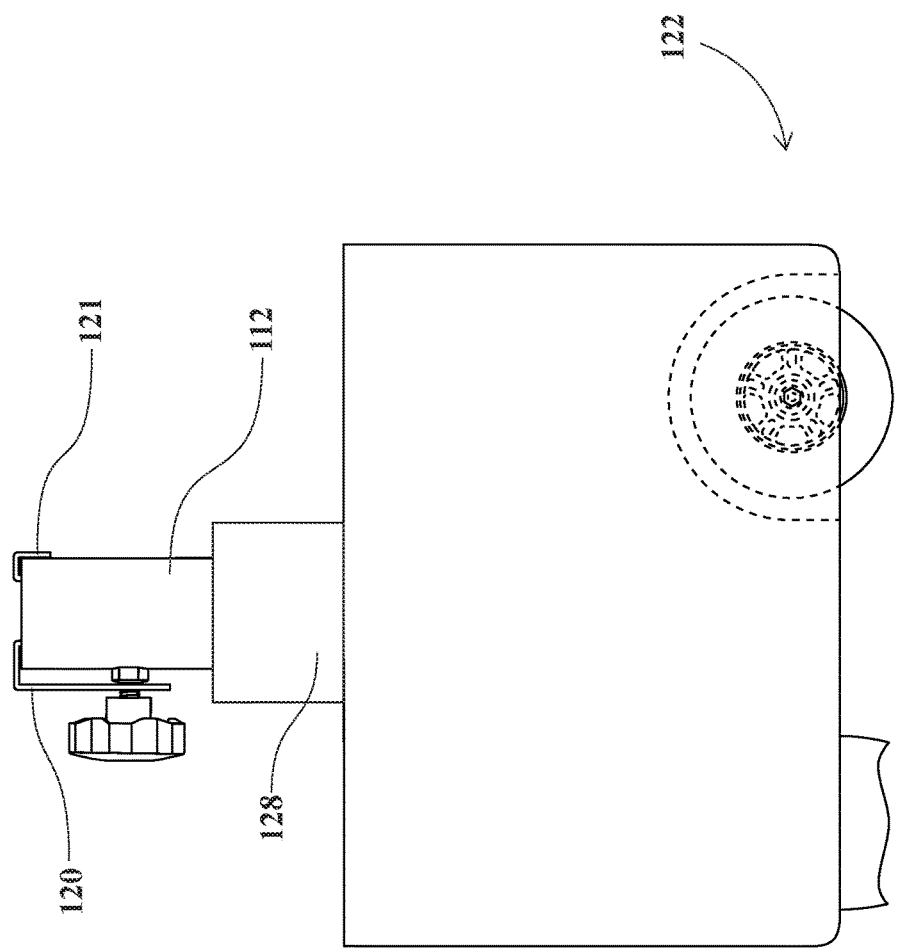
Figure 14:
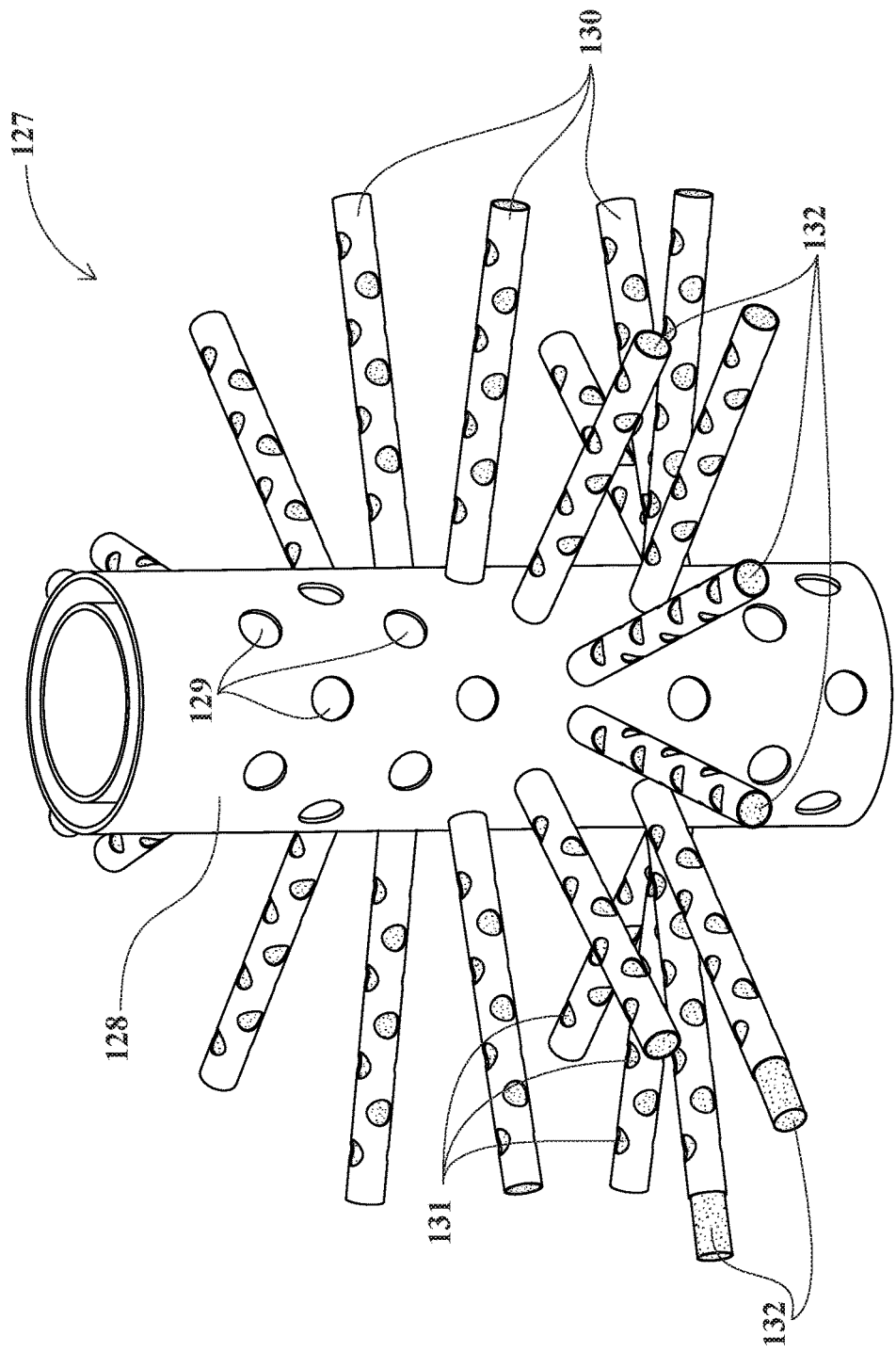
FIGS. 14 and 15 illustrate perspective views of how a rollable water-reservoir-and-water-regulating irrigation system and a rollable water-circulating system are connected to a rollable adjustable-umbrella-pole-receiver system.
Figure 15:
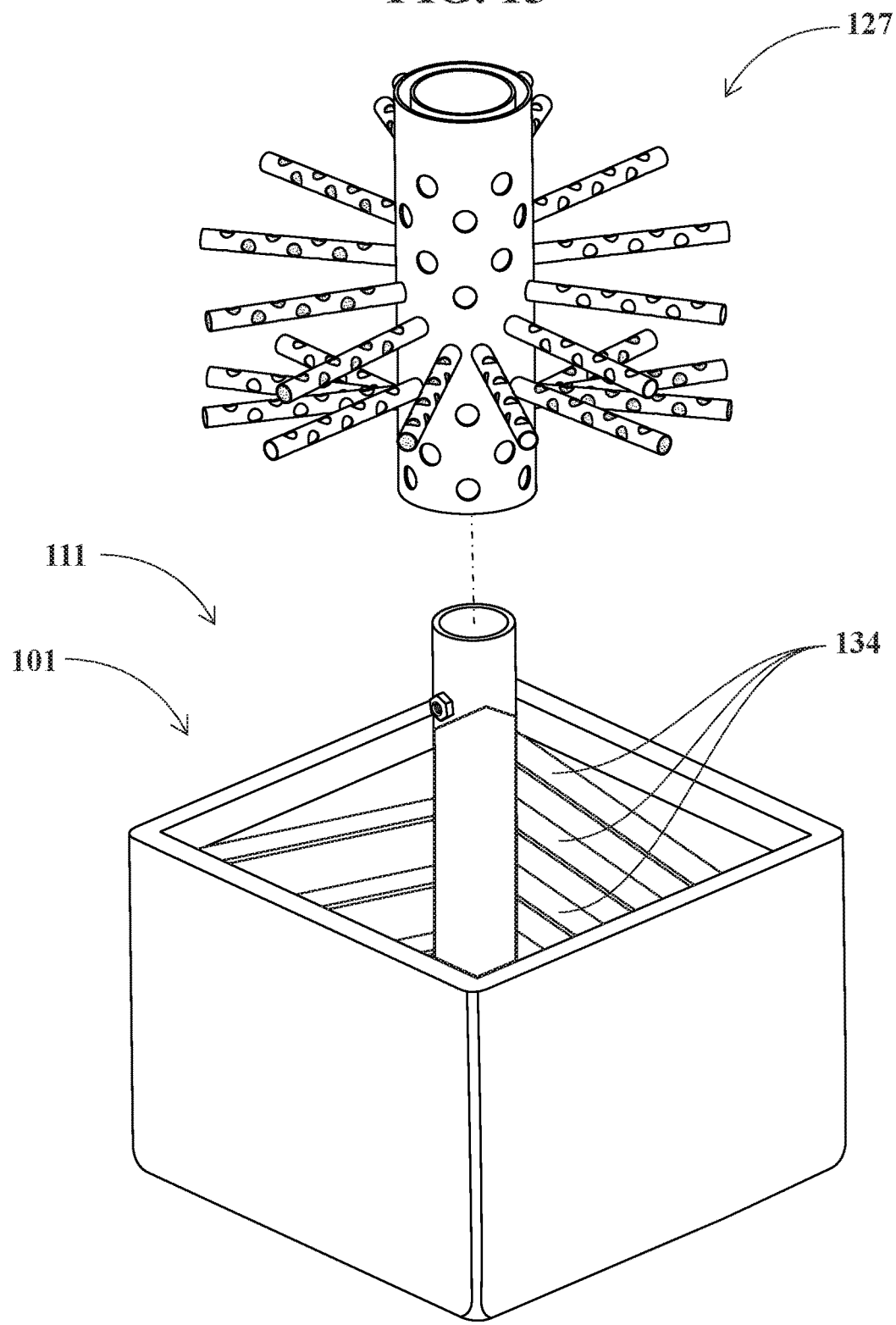
Figure 20:
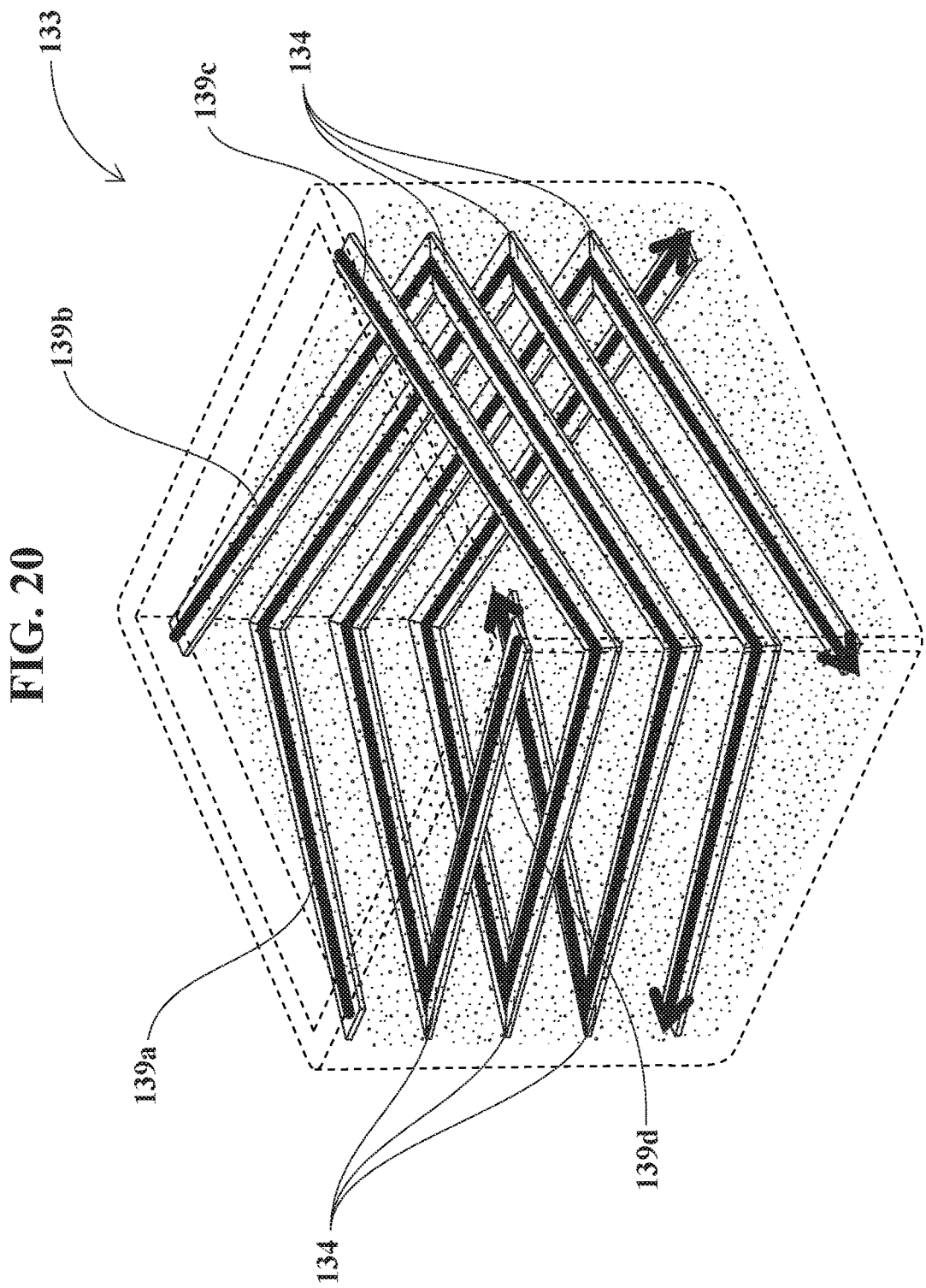
FIG. 20 illustrates an internal view of how a rollable water-circulating system spirally circulates and spirally regulates water for irrigation inside the unique rollable five-device-in-one system.

A rollable five-device-in-one flower container and umbrella stand comprises: a container having multiple walls and a bottom, water-regulating channels formed in the bottom, two wheel wells formed in the bottom, anti-rolling claws formed in the bottom for digging into the ground on a slope to prevent the five-device-in-one flower container and umbrella stand from sliding down the slope, an umbrella-pole receiver screwed on the bottom, U-shaped and J-shaped spring clamps hooked on the umbrella-pole receiver for creating a clamping force therebetween, two wheels partially hidden in the two wheel wells, a tubular double-wall water reservoir having spiral water-distributing tubes and spiral water-regulating foams for spirally and timely discharging the water, and spiral water-circulating slides spirally welded or molded to the walls for spirally creating multiple spiral tractions, multiple spiral layers, multiple spiral travel distances for soil and water to create multiple spiral root growths and multiple spiral nutrition absorptions.

DETAILED DESCRIPTION OF THE INVENTION

Component

A unique rollable five-device-in-one system comprises:
1) Rollable clawed-foot flower-container-and-umbrella-stand system,
2) Rollable adjustable-umbrella-pole-receiver system,
3) Rollable receiver-diameter-adjusting automatically-umbrella-pole-centering spring-bracket system,
4) Two wheel and axle systems,
5) Rollable water-reservoir-and-water-regulating irrigation system, and
6) Rollable water-circulating system.

Referring to FIGS. 1, 2, 3, 4, 5, 6, 7A, 7B, 8, 9A, 9B, 10A, 10B, 11, 12, 13, 14, and 15, the unique rollable five-device-in-one system comprises:
1) Rollable clawed-foot flower-container-and-umbrella-stand system 101, comprising:
2) Four flower-container-and-umbrella-base walls 102,
3) A flower-container-and-umbrella-base bottom 103a,
   Four water-regulating channels 103b,
4) Four bottom-strengthening umbrella legs 104,
5) A base-connecting bottom dome 105,
6) Four base-connecting bottom holes 106,
7) Four internally-threaded base-connecting bottom towers 107,
8) Water-drainage bottom holes 108,
9) Two wheel-hiding wells 109,
10) Two anti-rolling feet 110a, and
    Four anti-rolling claws 110b;
11) Rollable adjustable-umbrella-pole-receiver system 111, comprising:
12) A umbrella-pole receiver 112,
13) A threaded knob-screw hole 113,
14) A pole-locking knob-screw 114,
15) An umbrella-pole-receiver base 115,
16) Four threaded base holes 116,
17) Four base screws 117, and
18) Four base-screw washers 118;
19) Rollable receiver-diameter-adjusting automatically-umbrella-pole-centering spring-bracket system 119, comprising:
20) An adjustable U-shaped spring clamp 120, and
21) A fixed J-shaped automatically-umbrella-pole-centering spring clamp 121;
22) Two wheel and axle systems 122, each comprising:
23) A threaded wheel axle 123a,
    An axle washer 123b,
    An axle nut 123c,
24) An inner axle spacer 124,
25) An outer axle spacer 125,
26) A flower-container-and-umbrella-base wheel 126a, and
    Wheel-spacer-locking circular ridge 126b;
27) Rollable water-reservoir-and-water-regulating irrigation system 127, comprising:
28) A tubular water reservoir 128,
29) Water-distributing holes 129,
30) Spirally-disposed irrigation tubes 130,
31) Irrigation-tube holes 131,
32) Water-regulating foam cylinder 132, and
33) Rollable water-circulating system 133, comprising:
34) Spirally-disposed spirally-water-circulating slides 134.

Material
Referring to FIGS. 1, 2, 3, 4, 5, 6, 7A, 7B, 8, 9A, 9B, 10A, 10B, 11, 12, 13, 14, and 15:
1) Rollable clawed-foot flower-container-and-umbrella-stand system 101 is made of the combined materials of its components.
2) Four flower-container-and-umbrella-base walls 102 each are made of metallic material.
3) Flower-container-and-umbrella-base bottom 103a is made of metallic material.
   Four water-regulating channels 103b each are made of metallic material.
4) Four bottom-strengthening umbrella legs 104 each are made of metallic material.
5) Base-connecting bottom dome 105 is made of metallic material.
6) Four base-connecting bottom holes 106 each are made of empty space.
7) Four internally-threaded base-connecting bottom towers 107 each are made of metallic material.
8) Water-drainage bottom holes 108 each are made of empty space.
9) Two wheel-hiding wells 109 each are made of metallic material.
10) Two anti-rolling feet 110a each are made of metallic material.
    Four anti-rolling claws 110b each are made of metallic material.
11) Rollable adjustable-umbrella-pole-receiver system 111 is made of the combined materials of its components.
12) Umbrella-pole receiver 112 is made of metallic material.
13) Threaded knob-screw hole 113 is made of empty space.
14) Pole-locking knob-screw 114 is made of metallic and plastic material.
15) Umbrella-pole-receiver base 115 is made of metallic material.
16) Four threaded base holes 116 each are made of empty space.
17) Four base screws 117 each are made of metallic material.
18) Four base-screw washers 118 each are made of metallic material.
19) Rollable receiver-diameter-adjusting automatically-umbrella-pole-centering spring-bracket system 119 is made of the combined materials of its components.
20) Adjustable U-shaped spring clamp 120 is made of metallic material.
21) Fixed J-shaped automatically-umbrella-pole-centering spring clamp 121 is made of metallic material.
22) Two wheel and axle systems 122 each are made of the combined materials of its components.
23) Threaded wheel axle 123a is made of metallic material.
    Axle washer 123b is made of metallic material.
    Axle nut 123c is made of metallic material.
24) Inner axle spacer 124 is made of plastic material.
25) Outer axle spacer 125 is made of plastic material.
26) Flower-container-and-umbrella-base wheel 126a is made of rubber and plastic material.
    Wheel-spacer-locking circular ridge 126b is made of plastic material.
27) Rollable water-reservoir-and-water-regulating irrigation system 127 is made of the combined materials of its components.
28) Tubular water reservoir 128 is made of plastic or nylon material.
29) Water-distributing holes 129 each are made of empty space.
30) Spirally-disposed irrigation tubes 130 each are made of plastic or nylon material.
31) Irrigation-tube holes 131 each are made of empty space.
32) Water-regulating foam cylinder 132 is made of foamy material.
33) Rollable water-circulating system 133 is made of the combined materials of its components.
34) Spirally-disposed spirally-water-circulating slides 134 each are made of metallic material.

Shape
Referring to FIGS. 1, 2, 3, 4, 5, 6, 7A, 7B, 8, 9A, 9B, 10A, 10B, 11, 12, 13, 14, and 15:
1) Rollable clawed-foot flower-container-and-umbrella-stand system 101 has the combined shapes of its components.
2) Four flower-container-and-umbrella-base walls 102 each have a square shape.
3) Flower-container-and-umbrella-base bottom 103a has a square shape.
   Four water-regulating channels 103b each have a zigzagged shape with a letter-C cross-section.
4) Four bottom-strengthening umbrella legs 104 each have an elongated rectangular shape.
5) Base-connecting bottom dome 105 has a cubical shape.
6) Four base-connecting bottom holes 106 each have a round shape.
7) Four internally-threaded base-connecting bottom towers 107 each have a tubular shape.
8) Water-drainage bottom holes 108 each have a round shape.
9) Two wheel-hiding wells 109 each have a half-pie shape.
10) Two anti-rolling feet 110a each have a half-pie shape.
    Four anti-rolling claws 110b each have a clawlike shape.
11) Rollable adjustable-umbrella-pole-receiver system 111 has the combined shapes of its components.
12) Umbrella-pole receiver 112 has a tubular shape.
13) Threaded knob-screw hole 113 has a round shape.
14) Pole-locking knob-screw 114 has a starlike-knob-and-screw shape.
15) Umbrella-pole-receiver base 115 has a square shape.
16) Four threaded base holes 116 each have a round shape.
17) Four base screws 117 each have a screw shape.
18) Four base-screw washers 118 each have a doughnut shape.
19) Rollable receiver-diameter-adjusting automatically-umbrella-pole-centering spring-bracket system 119 has the combined shapes of its components.
20) Adjustable U-shaped spring clamp 120 has a letter-U shape.
21) Fixed J-shaped automatically-umbrella-pole-centering spring clamp 121 has a letter-J shape.
22) Two wheel and axle systems 122 each have the combined shapes of its components.
23) Threaded wheel axle 123a has a screw shape.
    Axle washer 123b has a doughnut shape.
    Axle nut 123c has a hexagonal shape.
24) Inner axle spacer 124 has a tubular shape.
25) Outer axle spacer 125 has a tubular shape.
26) Flower-container-and-umbrella-base wheel 126a has a doughnut shape.
    Wheel-spacer-locking circular ridge 126b has a ring shape.
27) Rollable water-reservoir-and-water-regulating irrigation system 127 has the combined shapes of its components.
28) Tubular water reservoir 128 has a double-tubular shape.
29) Water-distributing holes 129 each have a round shape.

30) Spirally-disposed irrigation tubes 130 each have a tubular shape.
31) Irrigation-tube holes 131 each have a round shape.
32) Water-regulating foam cylinder 132 has a cylindrical shape.
33) Rollable water-circulating system 133 has the combined shapes of its components.
34) Spirally-disposed spirally-water-circulating slides 134 each have an elongated rectangular shape.

Connection

Referring to FIGS. 1, 2, 3, 4, 5, 6, 7A, 7B, 8, 9A, 9B, 10A, 10B, 11, 12, 13, 14, and 15:

1) Rollable clawed-foot flower-container-and-umbrella-stand system 101 has the combined connections of its components.
2) Four flower-container-and-umbrella-base walls 102 respectively are molded to flower-container-and-umbrella-base bottom 103a.
3) Flower-container-and-umbrella-base bottom 103a is molded to four flower-container-and-umbrella-base walls 102.
   Four water-regulating channels 103b respectively are welded to flower-container-and-umbrella-base bottom 103a.
4) Four bottom-strengthening umbrella legs 104 respectively are welded to flower-container-and-umbrella-base bottom 103a.
5) Base-connecting bottom dome 105 is thermoformed in flower-container-and-umbrella-base bottom 103a.
6) Four base-connecting bottom holes 106 respectively are drilled in flower-container-and-umbrella-base bottom 103a.
7) Four internally-threaded base-connecting bottom towers 107 respectively are welded to flower-container-and-umbrella-base bottom 103a.
8) Water-drainage bottom holes 108 respectively are drilled in flower-container-and-umbrella-base bottom 103a.
9) Two wheel-hiding wells 109 respectively are thermoformed in flower-container-and-umbrella-base bottom 103a.
10) Two anti-rolling feet 110a respectively are thermoformed in flower-container-and-umbrella-base bottom 103a.
    Four anti-rolling claws 110b respectively are thermoformed on two anti-rolling feet 110a.
11) Rollable adjustable-umbrella-pole-receiver system 111 has the combined connections of its components.
12) Umbrella-pole receiver 112 is welded to umbrella-pole-receiver base 115.
13) Threaded knob-screw hole 113 is threadedly drilled through umbrella-pole receiver 112.
14) Pole-locking knob-screw 114 is screwed through threaded knob-screw hole 113.
15) Umbrella-pole-receiver base 115 is attached to base-connecting bottom dome 105.
16) Four threaded base holes 116 respectively are drilled in umbrella-pole-receiver base 115.
17) Four base screws 117 respectively are screwed through four threaded base holes 116, through four base-connecting bottom holes 106, and into four internally-threaded base-connecting bottom towers 107.
18) Four base-screw washers 118 respectively are slid on four base screws 117.
19) Rollable receiver-diameter-adjusting automatically-umbrella-pole-centering spring-bracket system 119 has the combined connections of its components.
20) Adjustable U-shaped spring clamp 120 is adjustably screwed on umbrella-pole receiver 112.
21) Fixed J-shaped automatically-umbrella-pole-centering spring clamp 121 is hooked on umbrella-pole receiver 112.
22) Two wheel and axle systems 122 respectively have the combined connections of its components.
23) Threaded wheel axle 123a is attached to one of two wheel-hiding wells 109.
    Axle washer 123b is slid on threaded wheel axle 123a.
    Axle nut 123c is screwed on threaded wheel axle 123a.
24) Inner axle spacer 124 is slid on threaded wheel axle 123a.
25) Outer axle spacer 125 is slid on threaded wheel axle 123a.
26) Flower-container-and-umbrella-base wheel 126a is slid on threaded wheel axle 123a, between inner axle spacer 124 and outer axle spacer 125.
    Wheel-spacer-locking circular ridge 126b is molded to flower-container-and-umbrella-base wheel 126a.
27) Rollable water-reservoir-and-water-regulating irrigation system 127 has the combined connections of its components.
28) Tubular water reservoir 128 is slid around umbrella-pole receiver 112.
29) Water-distributing holes 129 respectively are formed on tubular water reservoir 128.
30) Spirally-disposed irrigation tubes 130 respectively are attached to tubular water reservoir 128.
31) Irrigation-tube holes 131 respectively are formed on spirally-disposed irrigation tubes 130.
32) Water-regulating foam cylinders 132 respectively are inserted into spirally-disposed irrigation tubes 130.
33) Rollable water-circulating system 133 has the combined connections of its components.
34) Spirally-disposed spirally-water-circulating slides 134 respectively are spirally welded to four flower-container-and-umbrella-base walls 102.

Function

Referring to FIGS. 16, 17, 18A, 18B, 19, and 20:

1) Rollable clawed-foot flower-container-and-umbrella-stand system 101 is for performing the combined functions of its components.
2) Four flower-container-and-umbrella-base walls 102 respectively are for:
   Holding soil and water therebetween to grow plants;
   Holding sand therebetween to stabilize umbrella-pole receiver 112 and an umbrella pole when inserted therein; and
   Functioning (together with lower-container-and-umbrella-base bottom 103a) as a flower container.
3) Flower-container-and-umbrella-base bottom 103a is for:
   Holding soil and water thereon to grow plants;
   Holding sand thereon to stabilize umbrella-pole receiver 112 and an umbrella pole when inserted therein; and
   Functioning (together with four flower-container-and-umbrella-base walls 102) as both a flower container and an umbrella base at the same time.

Four water-regulating channels 103b respectively are for:
   Regulating the zigzag flow directions of water,
      in the directions of arrows 135a, 135b, and 135c (FIG. 16),
      to keep water in rollable clawed-foot flower-container-and-umbrella-stand system 101 longer to allow multiple plan roots to absorb more water;
   Expanding the travel areas of water
      to distribute water to multiple plan roots; and Lengthening the travel distances of water
to distribute water to multiple plan roots.
4) Four bottom-strengthening umbrella legs 104 respectively are for:
Strengthening flower-container-and-umbrella-base bottom 103a; and
Stabilizing umbrella-pole-receiver base 115 and umbrella-pole receiver 112;
Functioning (together with umbrella-pole-receiver base 115 and umbrella-pole receiver 112) as an umbrella stand.
5) Base-connecting bottom dome 105 is for:
Supporting umbrella-pole-receiver base 115.
6) Four base-connecting bottom holes 106 respectively are for:
Inserting base screws 117 therethrough.
7) Four internally-threaded base-connecting bottom towers 107 respectively are for:
Supporting base-connecting bottom dome 105.
8) Water-drainage bottom holes 108 respectively are for:
Draining excess water from rollable clawed-foot flower-container-and-umbrella-stand system 101.
9) Two wheel-hiding wells 109 respectively are for:
Housing and concealing two wheel and axle systems 122.
10) Two anti-rolling feet 110a respectively are for:
Providing stability to rollable clawed-foot flower-container-and-umbrella-stand system 101.
Four anti-rolling claws 110b respectively are for:
Digging into the ground when rollable clawed-foot flower-container-and-umbrella-stand system 101 sits on a slope or is pushed
in the directions of arrows 136a and 136b (FIG. 17),
to lock rollable clawed-foot flower-container-and-umbrella-stand system 101 in place to prevent it from moving.
11) Rollable adjustable-umbrella-pole-receiver system 111 is for performing the combined functions of its components.
12) Umbrella-pole receiver 112 is for:
Receiving an umbrella pole
Functioning (together with four bottom-strengthening umbrella legs 104 and umbrella-pole-receiver base 115) as an umbrella stand.
13) Threaded knob-screw hole 113 is for:
Screwing pole-locking knob-screw 114 therethrough.
14) Pole-locking knob-screw 114 is for:
Locking an umbrella pole inside umbrella-pole receiver 112.
15) Umbrella-pole-receiver base 115 is for:
Attaching umbrella-pole receiver 112 to flower-container-and-umbrella-base bottom 103a and four bottom-strengthening umbrella legs 104.
16) Four threaded base holes 116 respectively are for:
Screwing four base screws 117 therethrough.
17) Four base screws 117 respectively are for:
Locking umbrella-pole-receiver base 115 to flower-container-and-umbrella-base bottom 103a.
18) Four base-screw washers 118 respectively are for:
Being slid on four base screws 117.
19) Rollable receiver-diameter-adjusting automatically-umbrella-pole-centering spring-bracket system 119 is for performing the combined functions of its components.
20) Adjustable U-shaped spring clamp 120 is for:
Springably adapting to multiple umbrella poles of different diameters,
in the directions of arrow 137a
(FIG. 18A); and
Springably clamping multiple umbrella poles of different diameters.
21) Fixed J-shaped automatically-umbrella-pole-centering spring clamp 121 is for:
Automatically and springably centering multiple umbrella poles of different diameters;
Springably adapting to multiple umbrella poles of different diameters,
in the directions of arrow 137b
(FIG. 18B); and
Springably clamping multiple umbrella poles of different diameters.
22) Two wheel and axle systems 122 respectively are for performing the combined functions of its components.
23) Threaded wheel axle 123a is for:
Rotatably attaching flower-container-and-umbrella-base wheel 126a to one of two wheel-hiding wells 109.
Axle washer 123b is for:
Being slid on threaded wheel axle 123a.
Axle nut 123c is for:
Securing threaded wheel axle 123a to one of two wheel-hiding wells 109.
24) Inner axle spacer 124 is for:
Preventing flower-container-and-umbrella-base wheel 126a from touching one of two wheel-hiding wells 109.
25) Outer axle spacer 125 is for:
Preventing flower-container-and-umbrella-base wheel 126a from sliding away from one of two wheel-hiding wells 109.
26) Flower-container-and-umbrella-base wheel 126a is for:
Providing mobility to the unique rollable five-device-in-one system.
Wheel-spacer-locking circular ridge 126b is for:
Centering flower-container-and-umbrella-base wheel 126a between inner axle spacer 124 and outer axle spacer 125.
27) Rollable water-reservoir-and-water-regulating irrigation system 127 is for performing the combined functions of its components.
28) Tubular water reservoir 128 is for:
Storing water for irrigation;
Spirally and evenly distributing water to spirally-disposed irrigation tubes 130;
Spirally and evenly distributing water to multiple soil areas inside rollable clawed-foot flower-container-and-umbrella-stand system 101
to keep water in rollable clawed-foot flower-container-and-umbrella-stand system 101 longer to allow multiple plan roots in multiple soil areas to absorb more water;
Spirally and evenly distributing water to multiple soil layers inside rollable clawed-foot flower-container-and-umbrella-stand system 101
to keep water in rollable clawed-foot flower-container-and-umbrella-stand system 101 longer to allow multiple plan roots in multiple soil layers to absorb more water;
Regulating the spiral distributions of water
to keep water in rollable clawed-foot flower-container-and-umbrella-stand system 101 longer to allow multiple plan roots in multiple soil areas to absorb more water; and
Regulating the spiral distributions of water
to keep water in rollable clawed-foot flower-container-and-umbrella-stand system 101 longer to allow multiple plan roots in multiple soil layers to absorb more water.

29) Water-distributing holes 129 respectively are for:
Spirally and evenly distributing water to spirally-disposed irrigation tubes 130 and soil,
in the directions of arrows 138a
(FIG. 19);
Spirally and evenly distributing water to multiple soil areas inside rollable clawed-foot flower-container-and-umbrella-stand system 101,
in the directions of arrows 138a
(FIG. 19)
to keep water in rollable clawed-foot flower-container-and-umbrella-stand system 101 longer to allow multiple plan roots in multiple soil areas to absorb more water;
Spirally and evenly distributing water to multiple soil layers inside rollable clawed-foot flower-container-and-umbrella-stand system 101
in the directions of arrows 138a
(FIG. 19)
to keep water in rollable clawed-foot flower-container-and-umbrella-stand system 101 longer to allow multiple plan roots in multiple soil layers to absorb more water;
Regulating the spiral distributions of water
to keep water in rollable clawed-foot flower-container-and-umbrella-stand system 101 longer to allow multiple plan roots in multiple soil areas to absorb more water; and
Regulating the spiral distributions of water
to keep water in rollable clawed-foot flower-container-and-umbrella-stand system 101 longer to allow multiple plan roots in multiple soil layers to absorb more water.

30) Spirally-disposed irrigation tubes 130 respectively are for:
Spirally and evenly distributing water to multiple soil areas inside rollable clawed-foot flower-container-and-umbrella-stand system 101,
in the directions of arrows 138b, 138c, 138d, and 138e (FIG. 19),
to keep water in rollable clawed-foot flower-container-and-umbrella-stand system 101 longer to allow multiple plan roots in multiple soil areas to absorb more water;
Spirally and evenly distributing water to multiple soil layers inside rollable clawed-foot flower-container-and-umbrella-stand system 101,
in the directions of arrows 138b, 138c, 138d, and 138e (FIG. 19),
to keep water in rollable clawed-foot flower-container-and-umbrella-stand system 101 longer to allow multiple plan roots in multiple soil layers to absorb more water;
Regulating the spiral distributions of water
to keep water in rollable clawed-foot flower-container-and-umbrella-stand system 101 longer to allow multiple plan roots in multiple soil areas to absorb more water;
Regulating the spiral distributions of water
to keep water in rollable clawed-foot flower-container-and-umbrella-stand system 101 longer to allow multiple plan roots in multiple soil layers to absorb more water.
Expanding the travel areas of water
to distribute water to multiple plan roots; and
Lengthening the travel distances of water
to distribute water to multiple plan roots.

31) Irrigation-tube holes 131 respectively are for:
Spirally and evenly distributing water to multiple soil areas inside rollable clawed-foot flower-container-and-umbrella-stand system 101,
in the directions of arrows 138b, 138c, 138d, and 138e (FIG. 19)
to keep water in rollable clawed-foot flower-container-and-umbrella-stand system 101 longer to allow multiple plan roots in multiple soil areas to absorb more water;
Spirally and evenly distributing water to multiple soil layers inside rollable clawed-foot flower-container-and-umbrella-stand system 101,
in the directions of arrows 138b, 138c, 138d, and 138e (FIG. 19)
to keep water in rollable clawed-foot flower-container-and-umbrella-stand system 101 longer to allow multiple plan roots in multiple soil layers to absorb more water;
Regulating the spiral distributions of water
to keep water in rollable clawed-foot flower-container-and-umbrella-stand system 101 longer to allow multiple plan roots in multiple soil areas to absorb more water; and
Regulating the spiral distributions of water
to keep water in rollable clawed-foot flower-container-and-umbrella-stand system 101 longer to allow multiple plan roots in multiple soil layers to absorb more water.

32) Water-regulating foam cylinders 132 respectively are for:
Spirally and evenly absorbing and storing water inside spirally-disposed irrigation tubes 130 in multiple soil areas;
Spirally and evenly absorbing and storing water inside spirally-disposed irrigation tubes 130 in multiple soil layers;
Gradually, spirally, and evenly distributing water in multiple soil areas,
in the directions of arrows 138b, 138c, 138d, and 138e (FIG. 19),
to irrigate multiple plan roots;
Gradually, spirally, and evenly distributing water in multiple soil layers,
in the directions of arrows 138b, 138c, 138d, and 138e (FIG. 19),
to irrigate multiple plan roots;
Regulating the spiral distributions of water
to keep water in rollable clawed-foot flower-container-and-umbrella-stand system 101 longer to allow multiple plan roots in multiple soil areas to absorb more water;
Regulating the spiral distributions of water
to keep water in rollable clawed-foot flower-container-and-umbrella-stand system 101 longer to allow multiple plan roots in multiple soil layers to absorb more water.
Expanding the travel areas of water
to distribute water to multiple plan roots; and
Lengthening the travel distances of water
to distribute water to multiple plan roots.

33) Rollable water-circulating system 133 is for performing the combined functions of its components.

34) Spirally-disposed spirally-water-circulating slides 134 respectively are for:

Spirally and evenly circulating water to multiple soil areas inside rollable clawed-foot flower-container-and-umbrella-stand system 101,
in the directions of arrows 139a, 139b, 139c, and 139d (FIG. 20)
to keep water in rollable clawed-foot flower-container-and-umbrella-stand system 101 longer to allow multiple plan roots in multiple soil areas to absorb more water;
Spirally and evenly circulating water to multiple soil layers inside rollable clawed-foot flower-container-and-umbrella-stand system 101
to keep water in rollable clawed-foot flower-container-and-umbrella-stand system 101 longer to allow multiple plan roots in multiple soil layers to absorb more water;
Regulating the spiral distributions of water
to keep water in rollable clawed-foot flower-container-and-umbrella-stand system 101 longer to allow multiple plan roots in multiple soil areas to absorb more water;
Regulating the spiral distributions of water
to keep water in rollable clawed-foot flower-container-and-umbrella-stand system 101 longer to allow multiple plan roots in multiple soil layers to absorb more water.
Expanding the travel areas of water
to distribute water to multiple plan roots; and
Lengthening the travel distances of water
to distribute water to multiple plan roots before draining water,
in the directions of arrows 140a, 140b, and 140c (FIG. 19).

Variation

Figure 21:
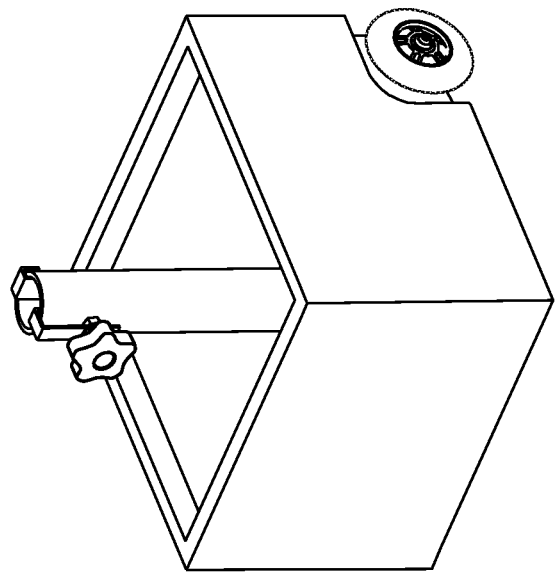
FIGS. 21 and 22 illustrate equivalent variations of the unique rollable five-device-in-one system.
Figure 22:
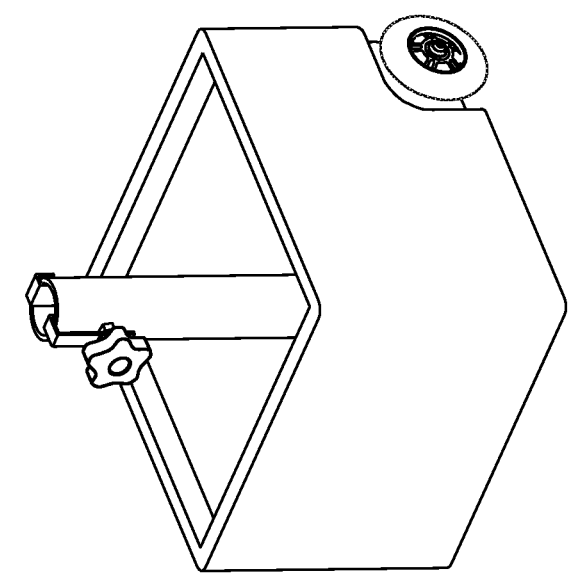

Any component of the unique rollable five-device-in-one system can have any shape and size. Any component of the unique rollable five-device-in-one system can be made of any material or any combination of any materials. Any component of the unique rollable five-device-in-one system can be made of any flexible, semi-flexible, bendable, semi-bendable, rigid, or semi-rigid material(s). For example, FIGS. 21 and 22 illustrate equivalent variations of the unique rollable five-device-in-one system. Each of equivalent variations can be built with or without base-connecting bottom dome 105, with or without two anti-rolling feet 110a, with or without four anti-rolling claws 110b, with or without four water-regulating channels 103b, or at least two of the above. For another example, four water-regulating channels 103b can be thermoformed on flower-container-and-umbrella-base bottom 103a. For another example, the unique rollable five-device-in-one system can contain soil, sand, the like, or the equivalent. The unique rollable five-device-in-one system can be made of metal, plastic, or composite. The unique rollable five-device-in-one system can have a round, square, rectangular, hexagonal, or any geometric shape.

MAJOR ADVANTAGES OF THE INVENTION

The present invention substantially departs from the conventional concepts and designs of the prior art. In doing so, the present invention provides a unique rollable five-device-in-one system (having: a) Rollable claw-foot flower container, b) Rollable adjustable-receiver umbrella stand, c) Rollable water reservoir, d) Rollable water-regulating irrigation system, and e) Rollable water-circulating system) having many unique and significant features, functions, and advantages, which overcome all the disadvantages of the prior art, as follows:
1) It is an object of the new invention to provide
a unique rollable five-device-in-one system, having
rollable spirally-disposed spirally-water-circulating slides.
Therefore, the unique rollable five-device-in-one system:
a) Can create spiral traction for soil to stay on,
to prevent the soil from being washed downwards
(FIGS. 1, 4, 5, 15, and 20);
b) Can create spiral traction for soil to stay on,
to prevent the soil from being washed away
(FIGS. 1, 4, 5, 15, and 20);
c) Can create spiral traction for soil to stay on,
to allow the soil to gradually move downwards spirally
(FIGS. 1, 4, 5, 15, and 20);
d) Can create spiral traction for soil to stay on,
to allow the soil to gradually move away spirally
(FIGS. 1, 4, 5, 15, and 20);
2) It is another object of the new invention to provide
a unique rollable five-device-in-one system, having
rollable spirally-disposed spirally-water-circulating slides.
Therefore, the unique rollable five-device-in-one system:
a) Can spirally redirect the moisture,
to be distributed over a larger surface area
(FIGS. 1, 4, 5, 15, and 20);
b) Can provide the moisture sufficient opportunity to osmotically distribute throughout soil within the container,
to evenly moisten the soil from top to bottom
(FIGS. 1, 4, 5, 15, and 20);
c) Can slowly disperse moisture,
to reduce the gravitational influence affecting the moisture
(FIGS. 1, 4, 5, 15, and 20);
d) Can utilize the moisture more effectively and efficiently,
to require less water, thereby lowering water costs
(FIGS. 1, 4, 5, 15, and 20); and
e) Can utilize the moisture more effectively and efficiently,
to require less water, thereby being more environmentally responsible
(FIGS. 1, 4, 5, 15, and 20).
3) It is still another object of the new invention to provide
a unique rollable five-device-in-one system, having
rollable four water-regulating channels.
Therefore, the unique rollable five-device-in-one system:
a) Can force water collection at flower-container-and-umbrella-base bottom,
to stimulate absorption into soil
(FIGS. 3, and 16);
b) Can act as a raceway to spread collected water through flower-container-and-umbrella-base bottom,
to evenly distribute moisture to plant root system
(FIGS. 3, and 16);
c) Can provide a network of cavities in which the plant root system will cluster and nest,
to enable root system to more affectively metabolize nutrients
(FIGS. 3, and 16); and
d) Can furnish a network of cavities in which the plant root system will cluster and nest, to provide greater surface area and therefore greater
stability for the root system
(FIGS. 3, and 16).
4) It is a further object of the new invention to provide
a unique rollable five-device-in-one system, having
two wheel hiding wells.
Therefore, the unique rollable five-device-in-one system:
a) Can enable larger circumference wheels, while axel
height being vertically higher than flower-container-
and-umbrella-base bottom,
to result in a lower center of gravity
(FIGS. 1, 2, 3, 4, 5 11, and 12);
b) Can enable larger circumference wheels, while axel
height being vertically higher than flower-container-
and-umbrella-base bottom,
to result in an easier and more convenient movement
of rollable clawed-foot flower-container-and-um-
brella-stand system
(FIGS. 1, 2, 3, 4, 5 11, and 12);
c) Can provide larger circumference wheels, while axel
height being vertically higher than flower-container-
and-umbrella-base bottom,
to contain and safely, rollably transport a relatively
heavier umbrella, flag pole, artificial tree, sign
post, etc.
(FIGS. 1, 2, 3, 4, 5 11, and 12); and
d) Can provide larger circumference wheels, while axel
height being vertically higher than flower-container-
and-umbrella-base bottom,
to contain and safely, rollably transport a relatively
taller umbrella, flag pole, artificial tree, sign post,
etc.
(FIGS. 1, 2, 3, 4, 5 11, and 12).
5) It is an even further object of the new invention to provide
a unique rollable five-device-in-one system, having
a rollable receiver-diameter-adjusting automatically-um-
brella-pole-center spring-bracket system.
Therefore, the unique rollable five-device-in-one system:
a) Can provide a convenient self-centering opposing-
spring clamp,
to accommodate umbrella poles, flag poles, artificial
trees, sign posts, etc. and self-center when inserted
(FIGS. 6, 7A, 7B, 9A, 9B, 10A, 10B, 13, 17, 18A and
18B);
b) Can provide a convenient diameter-adjusting oppos-
ing-spring clamp,
to secure a large range of diameters of umbrella
poles, flag poles, artificial trees, sign posts, etc.
(FIGS. 6, 7A, 7B, 9A, 9B, 10A, 10B, 13, 17, 18A and
18B);
c) Can provide a multi-functional opposing-spring pole
clamp,
to adjust to a variety of different diameters without
requiring any tools
(FIGS. 6, 7A, 7B, 9A, 9B, 10A, 10B, 13, 17, 18A and
18B); and
d) Can provide a self-storage system for auxiliary
components,
to instantly store an adjustable u-shaped spring
clamp and a fixed J-shaped automatically-um-
brella-pole-centering spring clamp, when not in
use
(FIGS. 6, 7A, 7B, 9A, 9B, 10A, 10B, 13, 17, 18A and
18B).
6) It is still another object of the new invention to provide
a unique rollable five-device-in-one system, having
a rollable water-reservoir-and-water-regulating irrigation
system.
Therefore, the unique rollable five-device-in-one system:
a) Can operate independently and is self-contained,
to be used in locations where there is no water spigot
available
(FIGS. 8, 9A, 9B, 10A, 10B, 13, 14, 15, and 19);
b) Can operate independently without a hose leading to
rollable clawed-foot flower-container-and-umbrella-
stand system,
to be used in public places without posing a danger
to pedestrians, from a hose being an obstacle and
a tripping hazard, such as a restaurant patio, a
sidewalk, a park, etc.
(FIGS. 8, 9A, 9B, 10A, 10B, 13, 14, 15, and 19);
c) Can function discretely while hidden by surrounding
plants,
to be aesthetically pleasing while displayed in public
areas
(FIGS. 8, 9A, 9B, 10A, 10B, 13, 14, 15, and 19); and
d) Can fully function discretely without a water hose
attached,
to be aesthetically pleasing while displayed in public
areas
(FIGS. 8, 9A, 9B, 10A, 10B, 13, 14, 15, and 19).
7) It is yet another object of the new invention to provide
a unique rollable five-device-in-one system, having
a tubular water reservoir, spirally-disposed irrigation
tubes, and water-regulating foam cylinder.
Therefore, the unique rollable five-device-in-one system:
a) Can distribute moisture to soil within a flower-
container-and-umbrella-base bottom,
to evenly moisten the soil from side to side
(FIGS. 14, 15, and 19);
b) Can distribute moisture to soil within a flower-
container-and-umbrella-base bottom,
to evenly moisten the soil from top to bottom
(FIGS. 14, 15, and 19);
c) Can sequentially distribute water in a spiral pattern
within a flower-container-and-umbrella-base bot-
tom,
to evenly moisten the soil from top to bottom
(FIGS. 14, 15, and 19);
d) Can sequentially distribute water in a spiral pattern
within a flower-container-and-umbrella-base bot-
tom,
to evenly moisten the soil from side to side
(FIGS. 14, 15, and 19); and
e) Can provide a structure of perforated tubes in which
the plant root system will attach,
to enable root system to bind with soil and container
more affectively
(FIGS. 14, 15, and 19).
8) It is still yet an even further object of the new invention
to provide
a unique rollable five-device-in-one system, having
two anti-rolling feet and four anti-rolling claws.
Therefore, the unique rollable five-device-in-one system:
a) Can provide unique self-adjusting, pliable, multi-
angled-surface friction blocks,
to resist movement thereby stabilizing rollable
clawed-foot flower-container-and-umbrella-stand
system when standing level on a concrete surface
(FIGS. 2, 3, 4, 5, 12, 13, and 17);
b) Can provide unique self-adjusting, pliable, multi-
angled-surface friction blocks, to resist movement thereby stabilizing rollable clawed-foot flower-container-and-umbrella-stand system when standing level on a gravel surface (FIGS. 2, 3, 4, 5, 12, 13, and 17);

c) Can provide unique self-adjusting, pliable, multi-angled-surface friction blocks,
to resist movement thereby stabilizing rollable clawed-foot flower-container-and-umbrella-stand system when standing level on a sandy surface (FIGS. 2, 3, 4, 5, 12, 13, and 17);

d) Can provide unique self-adjusting, pliable, multi-angled-surface friction blocks,
to resist movement thereby stabilizing rollable clawed-foot flower-container-and-umbrella-stand system when standing level on a tile surface (FIGS. 2, 3, 4, 5, 12, 13, and 17); and e) Can provide unique self-adjusting, pliable, multi-angled-surface friction blocks,
to resist movement thereby stabilizing rollable clawed-foot flower-container-and-umbrella-stand system when standing level on a slick surface (FIGS. 2, 3, 4, 5, 12, 13, and 17).

What is claimed is:

1. A rollable five-device-in-one flower container and umbrella stand comprising:
   a rollable clawed-foot container-and-stand system comprising:
     four flower-container-and-umbrella-base walls,
     a flower-container-and-umbrella-base bottom molded to said four-flower container-and-umbrella-base walls,
     a plurality of water-regulating channels respectively formed in said flower-container-and-umbrella-base bottom,
     four bottom-strengthening umbrella legs respectively welded to said flower-container-and-umbrella-base bottom,
     a dome formed in said flower-container-and-umbrella-base bottom, said dome having a dome undersurface and a dome uppersurface,
     a plurality of dome holes respectively drilled in said dome,
     a plurality of internally-threaded dome towers respectively welded to said dome undersurface of said dome,
     a plurality of water-draining bottom holes respectively drilled in said flower-container-and-umbrella-base bottom,
     two wheel-hiding wells each formed in said flower-container-and-umbrella-base bottom and having a well hole,
     two anti-rolling feet respectively formed in said flower-container-and-umbrella-base bottom, and
     a plurality of anti-rolling claws respectively formed on said two anti-rolling feet for digging into the ground on a slope
       to prevent said rollable five-device-in-one flower container from sliding down said slope;
   a rollable adjustable-umbrella-pole-receiver system comprising:
     an umbrella-pole receiver,
     a threaded knob-screw hole threadedly drilled through said umbrella-pole receiver,
     a pole-locking knob-screw screwed through said threaded knob-screw hole,
     an umbrella-pole-receiver base welded to said umbrella-pole receiver,
     a plurality of threaded base holes threadedly drilled through said umbrella-pole-receiver base,
     a plurality of base washers, and
     a plurality of base screws,
       said umbrella-pole-receiver base disposed on said dome uppersurface
         such that
           said umbrella-pole receiver is welded on said umbrella-pole-receiver base and said umbrella-pole-receiver base sits on said dome uppersurface,
       said base screws respectively inserted through said base washers, screwed through said internally-threaded dome towers, through said dome holes, and into said threaded base holes
         such that
           said umbrella-pole receiver and said umbrella-pole-receiver base are connected to said dome uppersurface of said dome;
   a rollable receiver-diameter-adjusting automatic-umbrella-pole-centering spring-bracket system comprising:
     an adjustable U-shaped spring clamp hooked on said umbrella-pole receiver, and
     a J-shaped automatically-umbrella-pole-centering spring clamp hooked on said umbrella-pole receiver
       for creating and centering an adjustable clamping force between said J-shaped automatically-umbrella-pole-centering spring clamp and said adjustable U-shaped spring clamp;
   two wheel-and-axle systems each comprising:
     an inner spacer,
     a wheel,
     an outer spacer,
     an axle washer,
     an axle having a threaded axle end,
       said axle inserted through said well hole, through said inner spacer, through said wheel, through said outer spacer, through said axle washer, and
     an axle nut screwed on said threaded axle end;
   a rollable water-reservoir-and-water-regulating irrigation system comprising:
     a tubular double-wall water reservoir slid on said umbrella-pole receiver
       for keeping soil and water away from said umbrella-pole receiver to prevent said umbrella-pole receiver from rusting,
       said water having a spiral travel distance,
     a plurality of water-distributing holes formed on said tubular double-wall water reservoir,
     a plurality of spirally-disposed irrigation tubes respectively attached to said water-distributing holes,
     a plurality of irrigation-tube holes formed on said spirally-disposed irrigation tubes, and
     a plurality of water-regulating foam cylinders respectively inserted into said spirally-disposed irrigation tubes
       for spirally and timely discharging said water
         from said tubular double-wall water reservoir,
         out of said water-distributing holes,
         into said spirally-disposed irrigation tubes,
         through said water-regulating foam cylinders, and
         out of said irrigation-tube holes; and
   a rollable water-circulating system comprising:
     spirally-disposed spirally-water-circulating slides spirally attached to said four flower-container-and-umbrella-base walls for spirally creating a plurality of spiral tractions for said soil
to stay thereon to spirally and evenly moisten said soil,
for spirally creating a plurality of spiral layers of said soil
to aerate said soil to spirally and evenly moisten said soil,
for spirally lengthening said spiral travel distance of said water
to spirally and evenly use less of said water,
for spirally redirecting said water in said soil
to spirally and evenly keep said water in said soil longer, and
for spirally nurturing spiral root growth in said spiral layers of said soil
to spirally and evenly facilitate efficient nutrition absorption,
whereby said rollable five-device-in-one flower container:
is for digging into the ground on said slope
to prevent said rollable five-device-in-one flower container from sliding down said slope;
is for creating and center said adjustable clamping force
between said J-shaped automatically-umbrella-pole-centering spring clamp and said adjustable U-shaped spring clamp,
is for keeping said soil and said water away from said umbrella-pole receiver
to prevent said umbrella-pole receiver from rusting,
is for spirally discharging said water
from said tubular double-wall water reservoir,
out of said water-distributing holes,
into said spirally-disposed irrigation tubes,
through said water-regulating foam cylinders, and
out of said irrigation-tube holes,
is for timely discharging said water
from said tubular double-wall water reservoir,
out of said water-distributing holes,
into said spirally-disposed irrigation tubes,
through said water-regulating foam cylinders, and
out of said irrigation-tube holes,
is for spirally creating a plurality of said spiral tractions for said soil
to stay thereon to spirally and evenly moisten said soil,
is for spirally creating a plurality of said spiral layers of said soil
to aerate said soil to spirally and evenly moisten said soil,
is for spirally lengthening said spiral travel distance of said water
to spirally and evenly use less of said water,
is for spirally redirecting said water in said soil
to spirally and evenly keep said water in said soil longer, and
is for spirally nurturing said spiral root growth in said spiral layers of said soil
to spirally and evenly facilitate said efficient nutrition absorption.

2. The rollable five-device-in-one flower container and umbrella stand of claim 1, wherein said spirally-disposed irrigation tubes and said spirally-disposed spirally-water-circulating slides have the same spiral pattern and the same spiral degree.

3. The rollable five-device-in-one flower container and umbrella stand of claim 1, wherein said tubular double-wall water reservoir comprises a first tube, a second tube inserted inside said first tube, and a ring bottom molded or welded to said first tube and said second tube.

4. The rollable five-device-in-one flower container and umbrella stand of claim 1, wherein said adjustable U-shaped spring clamp has a spring-clamp opening for said pole-locking knob-screw to be inserted therethrough.

5. The rollable five-device-in-one flower container and umbrella stand of claim 1, wherein said spirally-disposed spirally-water-circulating slides comprise four or sixteen slides.

6. The rollable five-device-in-one flower container and umbrella stand of claim 1, wherein said spirally-disposed spirally-water-circulating slides are spirally welded to said four flower-container-and-umbrella-base walls.

7. The rollable five-device-in-one flower container and umbrella stand of claim 1, wherein said spirally-disposed spirally-water-circulating slides are spirally molded to said four flower-container-and-umbrella-base walls.

8. The rollable five-device-in-one flower container and umbrella stand of claim 1, wherein said spirally-disposed spirally-water-circulating slides are made of metal or plastic.

9. The rollable five-device-in-one flower container and umbrella stand of claim 1, wherein said tubular double-wall water reservoir has a round or square cross-section.

10. A rollable flower container and umbrella stand comprising:
a container-and-stand system comprising:
four container-and-stand walls,
a container-and-stand bottom molded to said four container-and-stand walls,
a plurality of water-regulating channels respectively formed in said container-and-stand bottom,
a dome formed in said container-and-stand bottom,
said dome having a dome undersurface and a dome uppersurface,
a plurality of dome holes respectively drilled in said dome,
a plurality of internally-threaded dome towers respectively welded to said dome undersurface of said dome,
a plurality of water-draining bottom holes respectively drilled in said container-and-stand bottom,
two wheel-hiding wells each formed in said container-and-stand bottom and having a well hole,
two anti-rolling feet respectively formed in said container-and-stand bottom, and
a plurality of anti-rolling claws respectively formed on said two anti-rolling feet
for digging into the ground on a slope
to prevent said rollable five-device-in-one flower container from sliding down said slope;
an adjustable pole-receiver system comprising:
a pole receiver,
a knob-screw hole threadedly drilled through said pole receiver,
a pole-locking knob-screw screwed through said knob-screw hole,
a pole-receiver base welded to said pole receiver,
a plurality of base holes threadedly drilled through said pole-receiver base,
a plurality of base washers, and
a plurality of base screws,
said pole-receiver base disposed on said dome uppersurface
such that said pole receiver is welded on said pole-receiver base and said pole-receiver base sits on said dome uppersurface,
said base screws respectively inserted through said base washers, screwed through said internally-threaded dome towers, through said dome holes, and into said base holes
such that
said pole receiver and said pole-receiver base are connected to said dome uppersurface of said dome;
a automatic-pole-centering bracket system comprising:
an adjustable U-shaped spring clamp hooked on said pole receiver, and
a J-shaped automatic-pole-centering spring clamp hooked on said pole receiver
for creating and centering an adjustable clamping force between said J-shaped automatic-umbrella-pole-centering spring clamp and said adjustable U-shaped spring clamp;
two wheel-and-axle systems each comprising:
an inner spacer,
a wheel,
an outer spacer,
an axle washer,
an axle having a threaded axle end,
said axle inserted through said well hole, through said inner spacer, through said wheel, through said outer spacer, through said axle washer, and
an axle nut screwed on said threaded axle end;
a water-regulating system comprising:
a tubular water reservoir slid on said pole receiver
for keeping soil and water away from said pole receiver
to prevent said pole receiver from rusting,
said water having a spiral travel distance,
a plurality of water-distributing holes formed on said tubular water reservoir,
a plurality of spirally-disposed irrigation tubes respectively attached to said water-distributing holes,
a plurality of irrigation-tube holes formed on said spirally-disposed irrigation tubes, and
a plurality of water-regulating foam cylinders respectively inserted into said spirally-disposed irrigation tubes
for spirally and timely discharging said water
from said tubular water reservoir,
out of said water-distributing holes,
into said spirally-disposed irrigation tubes,
through said water-regulating foam cylinders, and
out of said irrigation-tube holes; and
a water-circulating system comprising:
spiral water-circulating slides spirally attached to said four container-and-stand walls
for spirally creating a plurality of spiral tractions for said soil
to stay thereon to spirally and evenly moisten said soil,
for spirally creating a plurality of spiral layers of said soil
to aerate said soil to spirally and evenly moisten said soil,
for spirally lengthening said spiral travel distance of said water
to spirally and evenly use less of said water,
for spirally redirecting said water in said soil
to spirally and evenly keep said water in said soil longer, and
for spirally nurturing spiral root growth in said spiral layers of said soil
to spirally and evenly facilitate efficient nutrition absorption.

11. The rollable flower container and umbrella stand of claim 10, wherein said spirally-disposed irrigation tubes and said spiral water-circulating slides have the same spiral pattern and the same spiral degree.

12. The rollable flower container and umbrella stand of claim 10, wherein said tubular water reservoir comprises a first tube, a second tube inserted inside said first tube, and a ring bottom molded or welded to said first tube and said second tube.

13. The rollable flower container and umbrella stand of claim 10, wherein said adjustable U-shaped spring clamp has a spring-clamp opening for said pole-locking knob-screw to be inserted therethrough.

14. The rollable flower container and umbrella stand of claim 10, wherein said spiral water-circulating slides comprise four or sixteen slides.

15. The rollable flower container and umbrella stand of claim 10, wherein said spiral water-circulating slides are spirally welded to said four container-and-stand walls.

16. The rollable flower container and umbrella stand of claim 10, wherein said spiral water-circulating slides are spirally molded to said four container-and-stand walls.

17. The rollable flower container and umbrella stand of claim 10, wherein said spiral water-circulating slides are made of metal or plastic.

18. The rollable flower container and umbrella stand of claim 10, wherein said tubular water reservoir has a round or square cross-section.

19. A rollable flower container and umbrella stand comprising:
four container-and-stand walls;
a container-and-stand bottom molded to said four container-and-stand walls;
a plurality of water-regulating channels respectively formed in said container-and-stand bottom;
a dome formed in said container-and-stand bottom,
said dome having a dome undersurface and a dome uppersurface;
a plurality of dome holes respectively drilled in said dome;
a plurality of internally-threaded dome towers respectively welded to said dome undersurface of said dome;
a plurality of water-draining bottom holes respectively drilled in said container-and-stand bottom;
two wheel-hiding wells each formed in said container-and-stand bottom and having a well hole;
two anti-rolling feet respectively formed in said container-and-stand bottom;
a plurality of anti-rolling claws respectively formed on said two anti-rolling feet
for digging into the ground on a slope
to prevent said rollable five-device-in-one flower container from sliding down said slope;
a pole receiver;
a knob-screw hole threadedly drilled through said pole receiver;
a pole-locking knob-screw screwed through said knob-screw hole;
a pole-receiver base welded to said pole receiver;
a plurality of base holes threadedly drilled through said pole-receiver base;

a plurality of base washers;
a plurality of base screws
   said pole-receiver base disposed on said dome uppersurface
   such that
      said pole receiver is welded on said pole-receiver base and said pole-receiver base sits on said dome uppersurface,
   said base screws respectively inserted through said base washers, screwed through said internally-threaded dome towers, through said dome holes, and into said base holes
   such that
      said pole receiver and said pole-receiver base are connected to said dome uppersurface of said dome;
an adjustable U-shaped spring clamp hooked on said pole receiver;
a J-shaped automatic-pole-centering spring clamp hooked on said pole receiver
   for creating and centering an adjustable clamping force between said J-shaped automatic-umbrella-pole-centering spring clamp and said adjustable U-shaped spring clamp;
an inner spacer;
a wheel;
an outer spacer;
an axle washer;
an axle having a threaded axle end,
   said axle inserted through said well hole, through said inner spacer,
   through said wheel, through said outer spacer, through said axle washer; and
an axle nut screwed on said threaded axle end.

20. The rollable flower container and umbrella stand of claim 19, wherein said adjustable U-shaped spring clamp has a spring-clamp opening for said pole-locking knob-screw to be inserted therethrough.

* * * * *